United States Patent
Frenne et al.

(10) Patent No.: US 10,771,998 B2
(45) Date of Patent: Sep. 8, 2020

(54) METHOD FOR CSI FEEDBACK

(71) Applicant: Telefonaktiebolaget LM Ericsson (publ), Stockholm (SE)

(72) Inventors: Mattias Frenne, Uppsala (SE); Johan Furuskog, Stockholm (SE); Robert Mark Harrison, Grapevine, TX (US); George Jöngren, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 75 days.

(21) Appl. No.: 15/517,785

(22) PCT Filed: Oct. 6, 2015

(86) PCT No.: PCT/SE2015/051057
§ 371 (c)(1),
(2) Date: Apr. 7, 2017

(87) PCT Pub. No.: WO2016/056981
PCT Pub. Date: Apr. 14, 2016

(65) Prior Publication Data
US 2017/0311311 A1    Oct. 26, 2017

Related U.S. Application Data

(60) Provisional application No. 62/062,397, filed on Oct. 10, 2014.

(51) Int. Cl.
*H04W 24/10* (2009.01)
*H04W 76/27* (2018.01)
(Continued)

(52) U.S. Cl.
CPC .......... *H04W 24/10* (2013.01); *H04B 7/0626* (2013.01); *H04B 7/0647* (2013.01);
(Continued)

(58) Field of Classification Search
CPC ............... H04W 24/10; H04W 72/082; H04W 72/0413; H04W 76/27; H04L 1/0026;
(Continued)

(56) References Cited

U.S. PATENT DOCUMENTS 8,406,215 B2    3/2013   Papasakellariou et al.
2011/0038302 A1  2/2011   Papasakellariou et al.
(Continued)

FOREIGN PATENT DOCUMENTS

EP    2734002 A1    5/2014
EP    2866358 A1    4/2015
(Continued)

OTHER PUBLICATIONS

Unknown, Author, "Configuring of a CoMP measurement set", Acer Incorporated, 3GPP TSG-RAN WG2 #79, R2-123799, Qingdao, P.R. China, Aug. 13-17, 2012, 1-1.
(Continued)

*Primary Examiner* — Benjamin H Elliott, IV
(74) *Attorney, Agent, or Firm* — Murphy, Bilak & Homiller, PLLC

(57) ABSTRACT

Embodiments of systems and methods for flexible Channel State Information (CSI) feedback in a cellular communications network are disclosed. In some embodiments, a base station configures a wireless device with a set of CSI-RS resources, dynamically configures a CSI-RS resource from the set of CSI-RS resources for measurement, and receives a CSI report from the wireless device determined from the CSI-RS resource dynamically configured for measurement. In this manner, the base station is enabled to dynamically configure and re-configure the CSI-RS resource(s) for measurement by the wireless device, which in turn provides
(Continued)

flexible CSI feedback that is particularly well-suited for embodiments in which the base station transmits beamformed CSI-RS.

19 Claims, 16 Drawing Sheets

(51) Int. Cl.
| | |
|---|---|
| *H04B 7/06* | (2006.01) |
| *H04L 5/00* | (2006.01) |
| *H04L 1/00* | (2006.01) |
| *H04W 72/04* | (2009.01) |
| *H04W 72/08* | (2009.01) |

(52) U.S. Cl.
CPC .......... *H04L 1/0026* (2013.01); *H04L 5/0048* (2013.01); *H04L 5/0053* (2013.01); *H04L 5/0057* (2013.01); *H04W 72/0413* (2013.01); *H04W 72/082* (2013.01); *H04W 76/27* (2018.02); *H04L 5/0023* (2013.01); *H04L 5/0035* (2013.01); *H04L 5/0094* (2013.01)

(58) Field of Classification Search
CPC ... H04L 5/0023; H04L 5/0035; H04L 5/0094; H04L 5/0048; H04L 5/0053; H04L 5/0057; H04B 7/0647; H04B 7/0626
See application file for complete search history.

(56) References Cited

U.S. PATENT DOCUMENTS

| | | | |
|---|---|---|---|
| 2012/0113816 A1 | 5/2012 | Bhattad et al. | |
| 2012/0287875 A1* | 11/2012 | Kim ....................... | H04B 7/024 370/329 |
| 2013/0156120 A1 | 6/2013 | Josiam et al. | |
| 2013/0196675 A1* | 8/2013 | Xiao ................... | H04W 72/082 455/452.1 |
| 2013/0208604 A1* | 8/2013 | Lee ..................... | H04L 25/0226 370/252 |
| 2013/0242773 A1 | 9/2013 | Wernersson et al. | |
| 2014/0003240 A1 | 1/2014 | Chen et al. | |
| 2014/0086084 A1* | 3/2014 | Bi ......................... | H04L 1/0026 370/252 |
| 2015/0098347 A1* | 4/2015 | Guo ................... | H04W 72/0413 370/252 |
| 2015/0162966 A1 | 6/2015 | Kim et al. | |
| 2016/0174093 A1* | 6/2016 | Zhou ..................... | H04L 5/0057 370/252 |
| 2016/0212643 A1 | 7/2016 | Park et al. | |

FOREIGN PATENT DOCUMENTS

| | | |
|---|---|---|
| RU | 2011123469 A | 12/2012 |
| WO | 2011019168 A2 | 2/2011 |
| WO | 2013109041 A1 | 7/2013 |
| WO | 2014003384 A1 | 1/2014 |
| WO | 2014116775 A1 | 7/2014 |
| WO | 2015199588 A1 | 12/2015 |

OTHER PUBLICATIONS

Unknown, Author , "DL control signaling for DL CoMP", Intel Corporation, 3GPP TSG-RAN WG1 #67, R1-113937, San-Francisco, USA, Nov. 14-18, 2018, 1-4.
3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0, Sep. 2014, 1-124.
3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.3.0, Sep. 2014, 1-212.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.3.0, Sep. 2014, 1-378.
Unknown, Author, "Overview of performance for Comp", 3GPP TSG-RAN WG4 Meeting #64bis, R4-125450, Santa Rosa, California, USA, Oct. 8-12, 2012, pp. 1-5.

* cited by examiner

METHOD FOR CSI FEEDBACK

TECHNICAL FIELD

The present disclosure relates to Channel State Information (CSI) feedback in a cellular communications network.

BACKGROUND

Long-Term Evolution (LTE) uses Orthogonal Frequency Division Multiplexing (OFDM) in the downlink and Discrete Fourier Transform (DFT)—spread OFDM in the uplink. The basic LTE downlink physical resource can thus be seen as a time-frequency grid as illustrated in FIG. 1, where each resource element corresponds to one OFDM subcarrier during one OFDM symbol interval.

As illustrated in FIG. 2, in the time domain, LTE downlink transmissions are organized into radio frames of 10 milliseconds (ms), each radio frame consisting of ten equally-sized subframes of length $T_{SUBFRAME}=1$ ms. For normal cyclic prefix, one subframe consists of 14 OFDM symbols. The duration of each OFDM symbol is approximately 71.4 microseconds (μs).

Furthermore, the resource allocation in LTE is typically described in terms of Resource Blocks (RBs), where a RB corresponds to one slot (0.5 ms) in the time domain and 12 contiguous subcarriers in the frequency domain. A pair of two adjacent RBs in the time direction (1.0 ms) is known as a RB pair. RBs are numbered in the frequency domain starting with 0 from one end of the system bandwidth.

Downlink transmissions are dynamically scheduled. In particular, in each subframe, the base station transmits control information about the terminals (i.e., User Equipment devices (UEs)) to which data is transmitted in the current downlink subframe. This control signaling, which is carried over the Physical Downlink Control Channel (PDCCH), is typically transmitted in the first 1, 2, 3, or 4 OFDM symbols in each subframe, where the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Release 11 onwards, the above-described resource assignments can also be scheduled on the Enhanced Physical Downlink Control Channel (EPDCCH). For Release 8 to Release 10 only the PDCCH is available.

The reference symbols shown in FIG. 3 are the Cell-Specific Reference Symbols (CRSs). The CRSs are used to support multiple functions including fine time- and frequency-synchronization and channel estimation for certain transmission modes.

In a cellular communications system, there is a need to measure the channel conditions in order to know what transmission parameters to use. These parameters include, e.g., modulation type, coding rate, transmission rank, and frequency allocation. This applies to Uplink (UL) as well as Downlink (DL) transmissions.

The scheduler that makes the decisions on the transmission parameters is typically located in the base station (i.e., the enhanced or evolved Node B (eNB)). Hence, the scheduler can measure channel properties of the UL directly using known reference signals that the terminals (i.e., UEs) transmit. These measurements then form a basis for the UL scheduling decisions that the eNB makes, which are then sent to the UEs via a DL control channel. Conversely, for the DL, the scheduler receives Channel State Information (CSI) feedback from the terminals, which is taken into consideration by the scheduler when selecting the transmission parameters for the DL transmissions to those terminals.

In LTE Release 8, CRSs are used in the DL for CSI estimation and feedback, and for channel estimation for demodulation. CRSs are transmitted in every subframe and are defined to support up to four Antenna Ports (APs). In LTE Release 10, to support up to eight APs, CSI Reference Signals (CSI-RSs) are defined for the UE to measure and feed back CSI relating to the multiple APs. Each CSI-RS resource consists of two Resource Elements (REs) over two consecutive OFDM symbols, and two different CSI-RSs (for two different APs) can share the same CSI-RS resource (two REs) by Code-Division Multiplexing (CDM). Also, a CSI-RS can be transmitted once per 5, 10, 20, 40, or 80 ms, where this timing is referred to as the CSI-RS periodicity. Therefore, CSI-RS has lower overhead and lower duty-cycle as compared to CRS. On the other hand, unlike CRS, CSI-RS is not used as a demodulation reference. Different CSI-RSs can also be transmitted with different offsets in the subframe, where the offset of the CSI-RS within the subframe is referred to as the CSI-RS subframe offset. When a CSI-RS is configured, the UE measures the channel for a given AP at each time instant and may interpolate the channel in between CSI-RS occasions to estimate the dynamically varying channel, e.g., by one interpolated sample per 1 ms instead of, e.g., one measured sample each 5 ms.

FIGS. 4A and 4B show examples of mappings from different CSI-RS configurations to REs in a RB pair. FIG. 4A illustrates the mapping for one or two APs, where 20 configurations are possible. The two CSI-RSs of the two APs of a particular cell can be transmitted by, for instance, configuration 0 by CDM, while CSI-RSs of APs of other neighboring cells can be transmitted by configuration j, with $1 \leq j \leq 19$, to avoid reference signal collisions with the CSI-RS in the cell. FIG. 4B shows the mapping for four APs, where 10 configurations are possible. The four CSI-RSs of the four APs of a particular cell can be transmitted by, for instance, configuration 0 by CDM, while CSI-RSs of APs of other neighboring cells can be transmitted by configuration j, with $1 \leq j \leq 9$.

The OFDM symbols used by the two consecutive REs for one CSI-RS are Quadrature Phase Shift Keying (QPSK) symbols, which are derived from a specified pseudo-random sequence. To randomize the interference, the initial state of the pseudo-random sequence generator is determined by the detected cell Identifier (ID) or a virtual cell ID configured to the UE by Radio Resource Control (RRC) signaling. CSI-RS with such non-zero-power OFDM symbols are called Non-Zero-Power (NZP) CSI-RS.

On the other hand, Zero-Power (ZP) CSI-RS can also be RRC-configured to the UE for the purpose of Interference Measurement (IM) (in Transmission Mode 10 (TM10) only), or for the purpose of improving the CSI estimation in other cells (in Transmission Mode 9 (TM9) or TM10). However, the CSI-RS mapping with four APs will always be used by the ZP CSI-RS. For example, in FIG. 4B, if configuration 0 with NZP CSI-RS is used by cell A to estimate the CSI of the two APs in cell A, configuration 0 with ZP CSI-RS (a total of four REs per RB pair) can be used by the neighboring cell B to minimize the DL interference to cell A over the four REs in configuration 0, such that the CSI estimation of the two APs in cell A can be improved.

In LTE TM10, up to four CSI processes and three NZP CSI-RS can be configured for a UE by RRC signaling. These four CSI processes can, for instance, be used to acquire CSI for APs in up to three different cells (or Transmission Points (TPs) within the same cell) in a Coordinated Multipoint (CoMP) framework. The four CSI processes can also be assigned to multiple different beams transmitted from the same eNB using an array antenna that is capable of beamforming in azimuth, elevation, or both (i.e., Two-Dimensional (2D) beamforming). See $3^{rd}$ Generation Partnership Project (3GPP) Technical Specification (TS) 36.213 V12.3.0, 3GPP TS 36.331 V12.3.0, and 3GPP TS 36.211 V12.3.0 for complete LTE specifications on how CSI processes and CSI-RS configurations are set up. A beam of a transmitted signal, such as a CSI-RS, is obtained by transmitting the same signal from multiple antenna elements in an array, but with individually controlled phase shifts (and potentially amplitude tapering) for each antenna element. The resulting radiation pattern of the transmitted signal thus has a different beam width and main pointing direction compared to the antenna element radiation pattern. Hence, a beamformed signal, such as beamformed CSI-RS, is obtained. Typically, the antenna elements at the transmitter are closely spaced, as to achieve correlated channels, which makes the beamforming more effective. The benefits of beamforming is reduced interference (due to the typically narrow beam width of the transmitted signal) and increased effective channel gain (due to the applied beamforming phase shifts at the transmitter which ensure a coherent addition of the signals from each transmit antenna at the receiver).

In order for the UE to derive the correct CSI, each CSI process in TM10 is associated (and configured by RRC signaling) with a signal hypothesis and an interference hypothesis. The signal hypothesis describes which NZP CSI-RS reflects the desired signal. The interference is measured in a configured CSI-IM resource, which is similar to a CSI-RS with four REs per Physical Resource Block (PRB) pair, which the UE uses for interference measurements. To better support the IM in CoMP, CSI-IM is standardized and is based on the ZP CSI-RS. Therefore, each of the up to four CSI processes consists of one NZP CSI-RS and one CSI-IM.

For a TM9 UE, only a single CSI process can be configured, and no CSI-IM is defined. The IM is thus unspecified in TM9. There is however still a possibility to get CSI feedback from two different Subframe (SF) sets: SF set 1 and SF set 2. For instance, based on, e.g., the Almost Blank Subframe (ABS) information signaled over X2, a pico eNB can configure a UE to feed back CSI for both protected (i.e., Reduced Power Subframes (RPSF)) subframes (where a corresponding macro eNB has reduced activity) and CSI for unprotected subframes in two different CSI reports. This gives the pico eNB information to perform link adaptation in the two types of subframes differently, depending on whether it is a protected subframe or not. It is also possible for a UE configured in TM10 to use both subframe sets and multiple CSI processes.

In LTE, the format of the CSI reports are specified in detail and may contain Channel Quality Information (CQI), Rank Indicator (RI), and Precoding Matrix Indicator (PMI). See 3GPP TS 36.213 V12.3.0. The reports can be wideband or applicable to subbands. They can be configured by a RRC message to be sent periodically or in an aperiodic manner or triggered by a control message from the eNB to a UE. The quality and reliability of the CSI are crucial for the eNB in order to make the best possible scheduling decisions for the upcoming DL transmissions.

The LTE standard does not specify how the UE should obtain and average the CSI-RS and CSI-IM measurements from multiple time instants, i.e., subframes. For example, the UE may measure over a time frame of multiple subframes, unknown to the eNB and combine several measurements in a UE-proprietary way to create the CSI values that are reported, either periodically or triggered.

In the context of LTE, the resources (i.e., the REs) available for transmission of CSI-RS are referred to as "CSI-RS resources." In addition, there are also "CSI-IM resources." The latter are defined from the same set of possible physical locations in the time/frequency grid as the CSI-RS, but with zero power, hence ZP CSI-RS. In other words, they are "silent" CSI-RSs and when the eNB is transmitting the shared data channel, it avoids mapping data to those REs used for CSI-IM. These are intended to give a UE the possibility to measure the power of any interference from another transmitter other than the serving node of the UE.

Each UE can be configured with one, three, or four different CSI processes. Each CSI process is associated with one CSI-RS and one CSI-IM resource where these CSI-RS resources have been configured to the UE by RRC signaling and are thus periodically transmitted/occurring with a periodicity of T and with a given subframe offset relative to the frame start.

If only one CSI process is used, then it is common to let the CSI-IM reflect the interference from all other eNBs, i.e., the serving cell uses a ZP CSI-RS that overlaps with the CSI-IM, but in other adjacent eNBs there is no ZP CSI-RS on these resources. In this way the UE will measure the interference from adjacent cells using the CSI-IM.

If additional CSI processes are configured to the UE, then there is possibility for the network to also configure a ZP CSI-RS resource in the adjacent eNB that overlaps with a CSI-IM resource for this CSI process for the UE in the serving eNB. In this way the UE will feed back accurate CSI also for the case when this adjacent cell is not transmitting. Hence, coordinated scheduling between eNBs is enabled with the use of multiple CSI processes and one CSI process feeds back CSI for the full interference case and the other CSI process feeds back CSI for the case when a (strongly interfering) adjacent cell is muted. As mentioned above, up to four CSI processes can be configured to the UE, thereby enabling feedback of four different transmission hypotheses.

The PDCCH/EPDCCH is used to carry Downlink Control Information (DCI) such as scheduling decisions and power control commands. More specifically, the DCI includes:

DL scheduling assignments, including Physical Downlink Shared Channel (PDSCH) resource indication, transport format, hybrid Automatic Repeat Request (ARQ) information, and control information related to spatial multiplexing (if applicable). A DL scheduling assignment also includes a command for power control of the Physical Uplink Control Channel (PUCCH) used for transmission of hybrid ARQ acknowledgements in response to DL scheduling assignments.

UL scheduling grants, including Physical Uplink Shared Channel (PUSCH) resource indication, transport format, and hybrid ARQ related information. A UL scheduling grant also includes a command for power control of the PUSCH.

Power control commands for a set of terminals as a complement to the commands included in the scheduling assignments/grants.

The PDCCH/EPDCCH region carries one or more DCI messages, each with one of the formats above. As multiple terminals can be scheduled simultaneously, on both DL and UL, there must be a possibility to transmit multiple scheduling messages within each subframe. Each scheduling message is transmitted on separate PDCCH/EPDCCH physical resources. Furthermore, to support different radio channel conditions, link adaptation can be used, where the code rate of the PDCCH/EPDCCH is selected by adapting the resource usage for the PDCCH/EPDCCH, to match the radio channel conditions.

Against this backdrop, future cellular communications networks are expected to utilize beamforming where the number of beams may exceed the number of CSI-RS resources. In addition, existing and future cellular communications networks sometimes use a multi-layer radio access network including a number of coverage cells (e.g., macro cells controlled by eNBs) and a number of capacity cells (e.g., pico cells controlled by pico eNBs). As such, there is a need for systems and methods that enable improved CSI-RS configuration, particularly for cellular communications networks that utilize beamforming and/or multi-layer radio access networks.

SUMMARY

Systems and methods relating to Channel State Information (CSI) feedback in a cellular communications network are disclosed. While not being limited thereto, embodiments disclosed here are particularly well-suited to improve CSI feedback in a cellular communications network that utilizes beamformed CSI Reference Signals (CSI-RSs) such that the same CSI-RS resource may be reused over time in different beams.

Embodiments of a method of operation of a base station of a cellular communications network to enable flexible CSI feedback are disclosed. In some embodiments, the method of operation of the base station comprises configuring a wireless device with a set of CSI-RS resources, dynamically configuring a CSI-RS resource from the set of CSI-RS resources for measurement via an uplink scheduling grant, a dedicated downlink control channel message, a downlink assignment; a Downlink Control Information (DCI) message, or a Medium Access Control (MAC) Control Element (CE), and receiving a CSI report from the wireless device determined from the CSI-RS resource dynamically configured for measurement. In this manner, the base station is enabled to dynamically configure and re-configure the CSI-RS resource(s) for measurement by the wireless device, which in turn provides flexible CSI feedback that is particularly well-suited for embodiments in which the base station transmits beamformed CSI-RS.

In some embodiments, the base station transmits beamformed CSI-RS, where each beamformed CSI-RS corresponds to a different beam direction. In some embodiments, each CSI-RS resource in the set of CSI-RS resources is beamformed and each CSI-RS resource corresponds to a different beam direction.

In some embodiments, the wireless device uses two or more CSI processes for CSI reporting. Configuring the wireless device with the set of CSI-RS resources comprises configuring the wireless device with the set of CSI-RS resources for a particular CSI process of the two or more CSI processes of the wireless device, and dynamically configuring the CSI-RS resource from the set of CSI-RS resources for measurement comprises dynamically configuring the CSI-RS resource from the set of CSI-RS resources such that the CSI-RS resource is configured for measurement for the particular CSI process. Further, in some embodiments, the method of operation of the base station further comprises configuring the wireless device with a respective set of CSI-RS resources for each additional CSI process of the two or more CSI processes of the wireless device and, for each additional CSI process of the wireless device, dynamically configuring a CSI-RS resource from the respective set of CSI-RS resources for measurement.

In some embodiments, the wireless device uses two or more CSI processes for CSI reporting, the set of CSI-RS resources is a common set of CSI-RS resources for the two or more CSI processes, and dynamically configuring the CSI-RS resource from the set of CSI-RS resources for measurement comprises dynamically configuring the CSI-RS resource from the set of CSI-RS resources such that the CSI-RS resource is configured for measurement for the two or more CSI processes.

In some embodiments, configuring the wireless device with the set of CSI-RS resources comprises configuring the wireless device with the set of CSI-RS resources via higher layer signaling.

In some embodiments, the method of operation of the base station further comprises receiving one or more additional CSI reports from the wireless device determined from the CSI-RS resource dynamically configured for measurement, wherein the one or more additional CSI reports are transmitted at predetermined time instants.

In some embodiments, the method of operation of the base station further comprises receiving a subsequent CSI report from the wireless device determined from a default CSI-RS resource.

In some embodiments, dynamically configuring the CSI-RS resource from the set of CSI-RS resources for measurement comprises dynamically configuring the CSI-RS resource from the set of CSI-RS resources for measurement such that the dynamic configuration of the CSI-RS resource holds until a subsequent dynamic configuration of a new CSI-RS resource is provided to the wireless device.

In some embodiments, the method of operation of the base station further comprises dynamically configuring a CSI Interference Measurement (IM) resource from a set of CSI-IM resources configured for interference measurement.

In some embodiments, Physical Downlink Shared Channel (PDSCH) rate matching is provided over the set of CSI-RS resources.

In some embodiments, the method of operation of the base station further comprises receiving an indication from the wireless device confirming that the CSI-RS resource was used for the CSI report.

In some embodiments, the method of operation of the base station further comprises receiving an acknowledgement from the wireless device that indicates that the dynamic configuration of the CSI-RS resource was received by the wireless device, and discarding any CSI reports received from the wireless device for a predefined amount of time after receiving the acknowledgement from the wireless device.

Embodiments of a base station of a cellular communications network are also disclosed. In some embodiments, the base station operates according to any one of the embodiments described herein.

Embodiments of a method of operation of a wireless device to provide flexible CSI feedback to a cellular communications network are also disclosed. In some embodiments, the method of operation of the wireless device comprises receiving a configuration of a set of CSI-RS resources from a base station of the cellular communications network, receiving a dynamic configuration a CSI-RS resource from the set of CSI-RS resources for measurement from the base station of the cellular communications network via an uplink scheduling grant, a dedicated downlink control channel message, a downlink assignment, a DCI message, or a MAC CE, performing one or more measurements on the CSI-RS resource dynamically configured for measurement, and transmitting a CSI report to the base station determined from the one or more measurements on the CSI-RS resource dynamically configured for measurement.

In some embodiments, the base station transmits beamformed CSI-RS, where each beamformed CSI-RS corresponds to a different beam direction. In some embodiments, each CSI-RS resource in the set of CSI-RS resources is beamformed and each CSI-RS resource corresponds to a different beam direction.

In some embodiments, the wireless device uses two or more CSI processes for CSI reporting. Receiving the configuration of the set of CSI-RS resources comprises receiving the configuration of the set of CSI-RS resources for a particular CSI process of the two or more CSI processes of the wireless device, and receiving the dynamic configuration of the CSI-RS resource from the set of CSI-RS resources for measurement comprises receiving the dynamic configuration of the CSI-RS resource from the set of CSI-RS resources for the particular CSI process. Further, in some embodiments, the method of operation of the wireless device further comprises receiving a configuration of a respective set of CSI-RS resources for each additional CSI process of the two or more CSI processes of the wireless device, and, for each additional CSI process of the wireless device, receiving a dynamic configuration of a CSI-RS resource from the respective set of CSI-RS resources for measurement.

In some embodiments, the wireless device uses two or more CSI processes for CSI reporting, the set of CSI-RS resources is a common set of CSI-RS resources for the two or more CSI processes, and receiving the dynamic configuration of the CSI-RS resource from the set of CSI-RS resources for measurement comprises receiving the dynamic configuration of the CSI-RS resource from the set of CSI-RS resources such that the CSI-RS resource is configured for measurement for the two or more CSI processes.

In some embodiments, receiving the configuration of the set of CSI-RS resources comprises receiving the configuration of the set of CSI-RS resources via higher layer signaling.

In some embodiments, the method of operation of the wireless device further comprises performing one or more additional measurements on the CSI-RS resource dynamically configured for measurement, and transmitting one or more additional CSI reports from the wireless device determined from the one or more additional measurements on the CSI-RS resource dynamically configured for measurement, wherein the one or more additional CSI reports are transmitted at predetermined time instants.

In some embodiments, the method of operation of the wireless device further comprises performing one or more subsequent measurements on a default CSI-RS resource, and transmitting a subsequent CSI report from the wireless device determined from the one or more subsequent measurements on the default CSI-RS resource.

In some embodiments, the dynamic configuration of the CSI-RS resource holds until a subsequent dynamic configuration of a new CSI-RS resource is provided to the wireless device.

In some embodiments, the method of operation of the wireless device further comprises receiving, from the base station, a dynamic configuration for a CSI-IM resource from a set of CSI-IM resources configured for the wireless device for interference measurement.

In some embodiments, PDSCH rate matching over the set of CSI-RS resources is assumed by the wireless device.

In some embodiments, the method of operation of the wireless device further comprises transmitting an indication to the base station that confirms that the CSI-RS resource was used for the CSI report.

Embodiments of a wireless device enabled to provide flexible CSI feedback to a cellular communications network are also disclosed. In some embodiments, the wireless device operates according to any one of the embodiments described herein.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
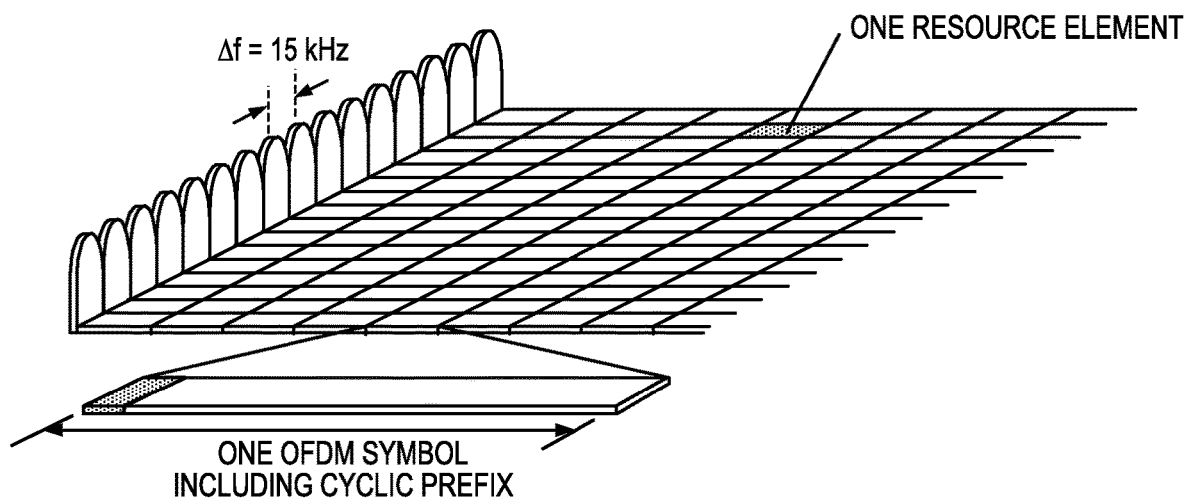
FIG. 1 illustrates the LTE downlink physical resource.
Figure 2:
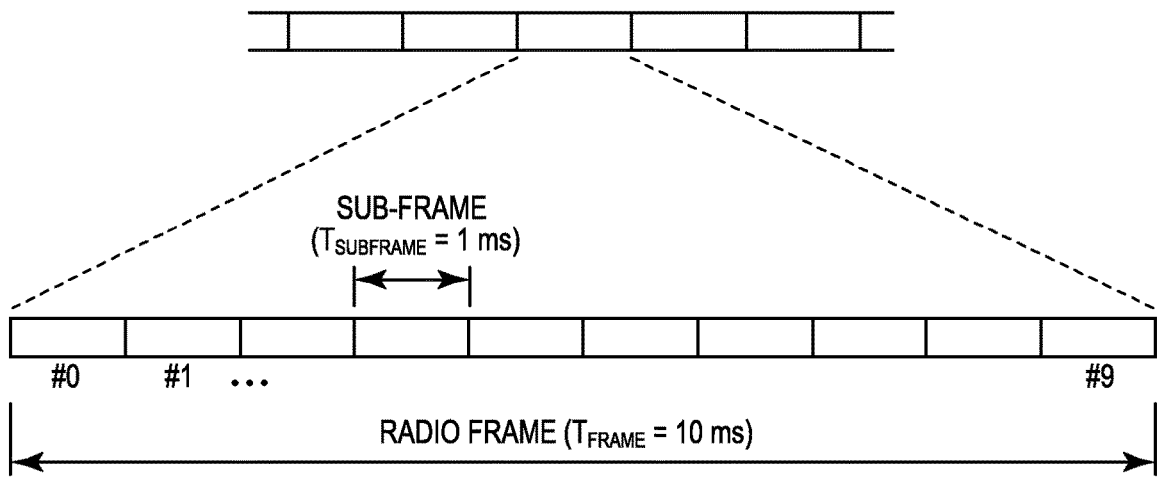
FIG. 2 illustrates the LTE time-domain structure.
Figure 3:
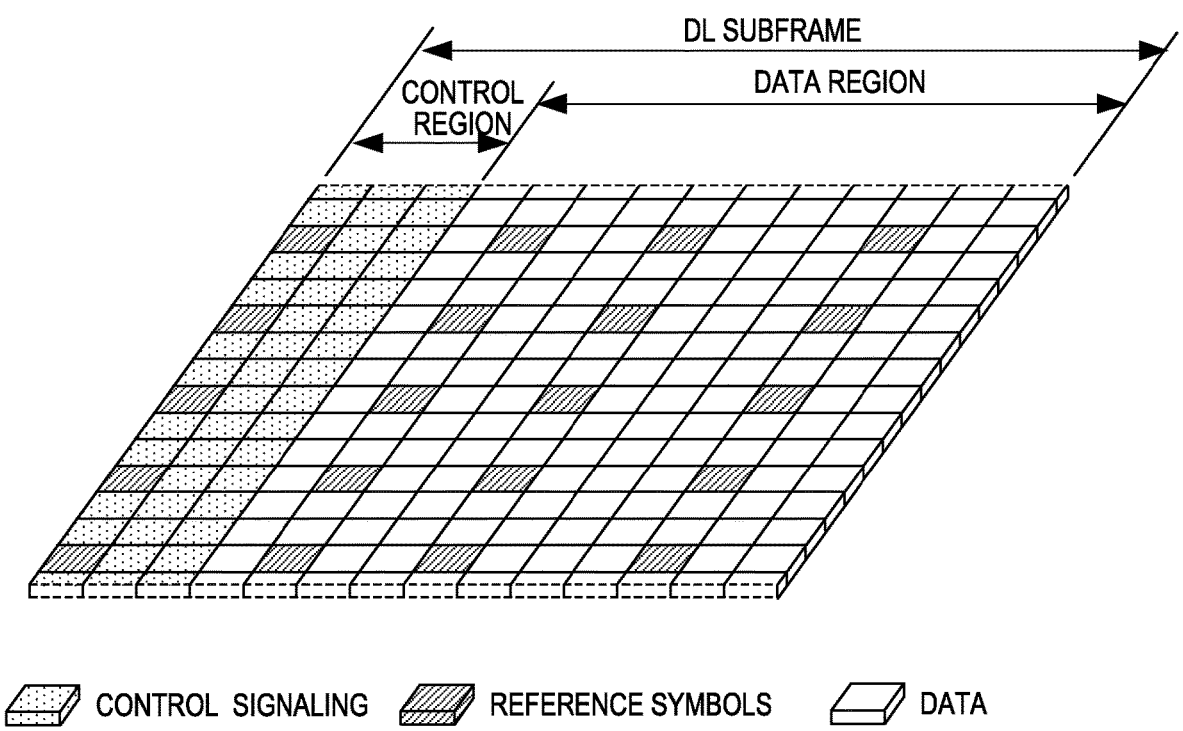
FIG. 3 illustrates a downlink subframe.
Figure 4A:
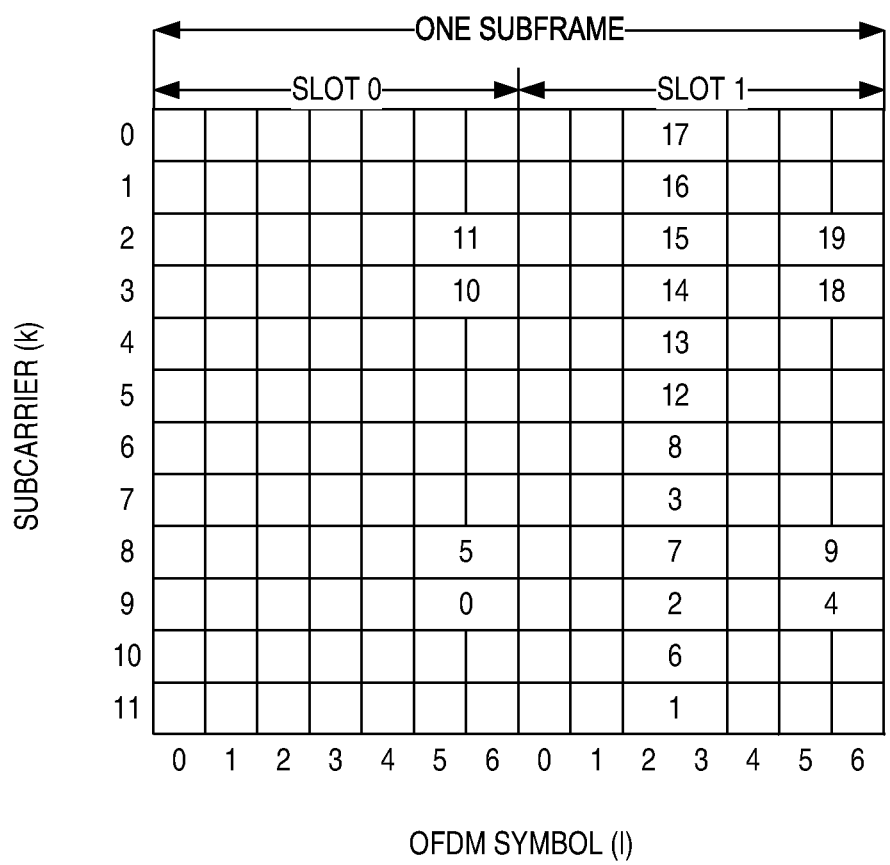
FIGS. 4A and 4B illustrate configurations of Channel State Information Reference Signal (CSI-RS) for different numbers of antenna ports.
Figure 4B:
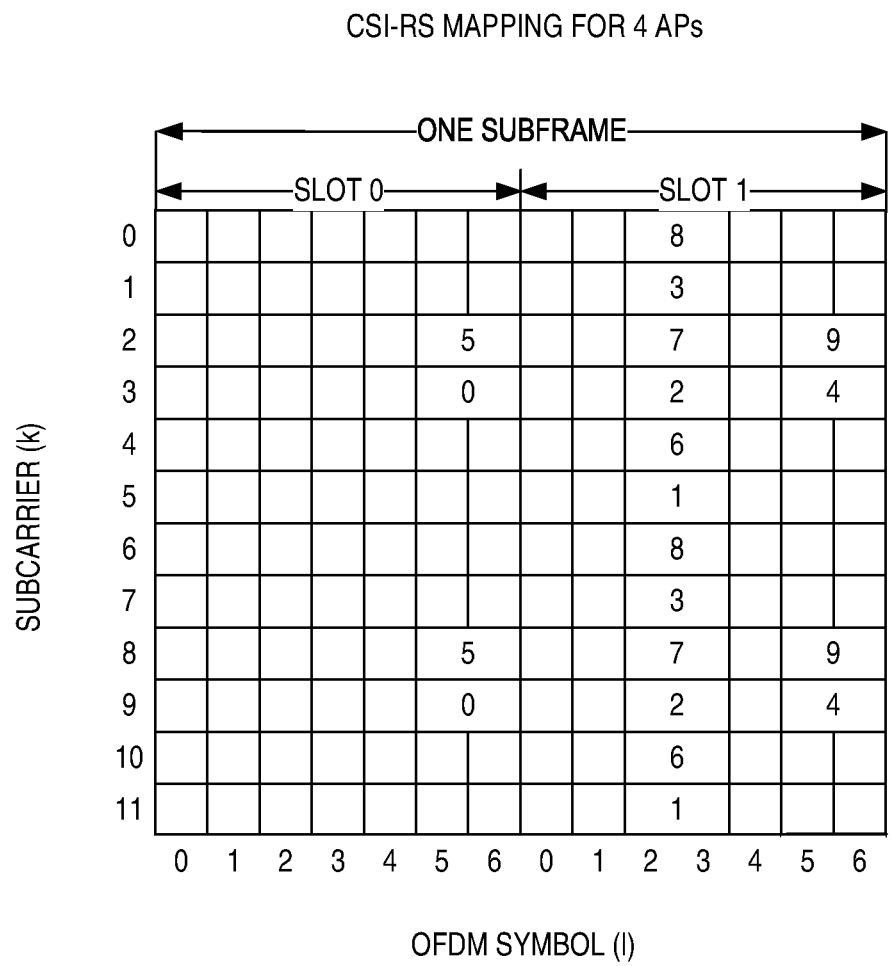

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Note that although terminology from 3$^{rd}$ Generation Partnership Program (3GPP) Long-Term Evolution (LTE) has been used in this disclosure to exemplify the embodiments of the present disclosure, this should not be seen as limiting the scope of the concepts disclosed herein to only the aforementioned system. Other wireless systems, including Wideband Code Division Multiple Access (WCDMA), WiFi, WiMax, LTE for unlicensed band, Ultra Mobile Broadband (UMB), and Global System for Mobile Communications (GSM), may also benefit from exploiting the ideas covered within this disclosure.

Also note that terminology such as enhanced or evolved Node B (eNB) and User Equipment (UE) should be considered as non-limiting and, in particular, does not imply a certain hierarchical relationship between the eNB and the UE. In general, "eNB" or "Transmission Point (TP)" could be considered as device 1 and "UE" as device 2, and these two devices communicate with each other over some radio channel. The disclosure also focuses on wireless transmissions in the downlink, but the disclosure is equally applicable in the uplink.

Before describing embodiments of the present disclosure, a discussion of some problems associated with conventional Channel State Information Reference Signal (CSI-RS) is beneficial. Some problems addressed in this disclosure relate to an eNB that transmits beamformed CSI-RSs, where each CSI-RS is associated with a certain, potentially narrow, beam transmitted from, e.g., an array antenna. In other words, each CSI-RS is transmitted using a different precoder or different beamforming weights.

Existing Channel State Information (CSI) feedback solutions have several problems that are addressed in the present disclosure. Reconfiguration of the CSI-RS to measure on requires Radio Resource Control (RRC) signaling, which has two problems. First, there is a delay to establish the reconfiguration, which may be up to 10 milliseconds (ms). Second, it is uncertain when the UE has adopted the reconfiguration, hence there is a period of uncertainty in system operation. Another problem with existing CSI feedback solutions is that using multiple CSI processes requires significant UE complexity, uplink signaling overhead, and power consumption, all of which are undesirable for network and UE implementation.

Another problem is that, if beamformed CSI-RSs are used and the UE moves in a tangential direction as seen from the eNB, the CSI-RS on which the UE measures needs to be reconfigured often as the UE moves from the main lobe of one beam to the main lobe of another beam. This problem is particularly severe in case of high tangential UE velocity or narrow beams from the eNB (i.e., a large number of horizontal array antennas).

The Physical Downlink Control Channel (PDCCH) and the Enhanced PDCCH (EPDCCH) can have relatively high block error rates, which means that the network may not know if a given Downlink Control Information (DCI) message is correctly received. Therefore, in case a DCI message changes a parameter used for periodic CSI reporting, the network may not know if the parameter contained in the DCI is used in subsequent periodic CSI reports since the UE may transmit periodic CSI reports using the same format and timing both before and after receiving (or not receiving) the DCI message.

Systems and methods relating to improved CSI feedback solutions that, at least in some embodiments, address the problems described above are disclosed. In some embodiments, an eNB indicates to a UE by higher layer signaling (e.g., RRC signaling) or in a DCI message that the UE is not allowed to perform channel interpolation of CSI-RS estimates across subframes. In some embodiments, the eNB also indicates that averaging of CSI-IM estimates is not allowed across subframes. In other words, the indication that the UE is not allowed to perform channel interpolation of CSI-RS estimates across subframes would ensure that no inter subframe filtering of Non-Zero-Power (NZP) CSI-RS based channel estimates is performed for the purpose of CSI feedback on a CSI process. The signaling may further indicate the CSI processes for which inter-subframe interpolation/filtering is disabled (e.g., predetermined to be all or a subset of the possible CSI processes). In some embodiments, the RRC information element for configuring a CSI process may be extended with a bit controlling whether inter-subframe NZP CSI-RS filtering is enabled or disabled.

Disabling of inter-subframe interpolation/filtering of CSI-RS estimates may be particularly beneficial when CSI-RS resources are reused over time between different beams transmitted by the eNB. In particular, when the eNB transmits beamformed CSI-RS and the number of beams is large (e.g., exceeds the number of CSI-RS resources available), then it may be beneficial for the eNB to re-use the same CSI-RS resources on different beams over time. In other words, a particular CSI-RS resource may be used for a first beam during one subframe, and the same CSI-RS resource may be used for a second beam during another subframe. When re-using CSI-RS resources over time between different beams, the performance of conventional inter-subframe interpolation/filtering schemes utilized by the UE generates CSI-RS measurements will result in poor CSI-RS estimates since measurements of different beams will be combined. Therefore, by disabling inter-subframe interpolation/filtering of CSI-RS estimates by the UE, the eNB improves the resulting CSI feedback as the eNB will know exactly which subframe and CSI-RS, and thus which beam, a particular CSI feedback report is associated with.

In a further embodiment of disabled inter-subframe filtering, the UE is monitoring a set of NZP CSI-RS configurations and selects a subset of those NZP CSI-RS configurations for reporting CSI. The selection could, for example, be based on estimates of channel strengths for the monitored NZP CSI-RS configurations (e.g., the subset could be selected to correspond to the N strongest channels). The UE could be configured (via, e.g., a higher layer message) with such a monitoring set for each of its CSI processes. The monitoring sets could be CSI process specific. With this embodiment, the network can now dynamically change the beams used on a set of (periodically reoccurring) NZP CSI-RS resources significantly larger than the current maximum number of NZP CSI-RS configurations currently handled by a single UE (which is three) without forcing the UE to handle the extra complexity of computing CSI for the entire monitoring set (computing channel strength is significantly simpler than computing CSI).

In some embodiments, an eNB configures a UE with a set of K CSI-RS resources (also known as CSI-RS configurations) by higher layer signaling, e.g. by using an RRC message. The CSI-RSs are periodically transmitted, potentially with different periodicity.

In some embodiments, the K resources correspond to K different beam directions as seen from the eNB. A typical number is K=20 since 20 two-port CSI-RS can be transmitted in a single subframe according to LTE specifications (3GPP TS 36.211 V12.3.0).

The eNB indicates to the UE, possibly in an uplink scheduling grant message or some other form of message (e.g., downlink assignment or a dedicated message on a downlink control channel), a CSI-RS resource (/configuration) of the K CSI-RS resources (/configurations). This CSI resource is the RS for which the UE should perform channel measurements (hence the CSI-RS may be referred to as NZP CSI-RS) and use for at least one subsequent CSI report. A CSI report transmitted on the uplink from the UE is then computed using measurements on the single CSI-RS out of the set of K possible CSI-RSs. Since a single CSI report and a single CSI process is used, the UE complexity is reduced compared to using multiple CSI processes. In some embodiments, the signaling may take the form of associating the indicated CSI-RS resource (/configuration) with a CSI process, implying that CSI feedback for the corresponding CSI process would use the so associated NZP CSI-RS. In other embodiments, the indicated CSI-RS resource (/configuration) may be associated with multiple CSI processes. In some embodiments, the same signaling message may contain multiple indications of associations between CSI-RS resources (/configurations) and CSI processes. In some embodiments, the association may hold for a single CSI reporting instance (e.g., one associated with the signaling message). If an additional CSI report is thereafter sent, the corresponding CSI process may revert back to using a default CSI-RS resource (/configuration). Such a default CSI-RS resource may, for example, be represented by the semi-statically configured CSI configuration that is associated with the CSI process according to an LTE Release 11 RRC mechanism (for more information, see 3GPP 36.331 V12.3.0). This may be the case for CSI on Physical Uplink Shared Channel (PUSCH) (aperiodic) and/or Physical Uplink Control Channel (PUCCH) (periodic). Alternatively, the dynamically signaled association between the CSI resource (/configuration) and the CSI process may hold until another association for that CSI process is signaled.

In some further embodiments, the eNB also indicates which one of the K CSI-RS resources that should be used as a CSI Interference Measurement (CSI-IM) resource.

In some embodiments, the UE assumes a Physical Downlink Shared Channel (PDSCH) rate matching around all K CSI-RS resources indicated in the higher layer configuration.

In some further embodiments, periodic CSI reports using PUCCH are computed based on the CSI-RS resource indicated in a downlink DCI message. The UE will use the selected CSI-RS resource for CSI feedback until an indication of a new CSI-RS is received by the UE in a DCI message. Additionally, the UE may provide an indication confirming which CSI-RS resource is measured, the indication comprising an index of the measured CSI-RS resource, or alternatively a bit confirming that the downlink DCI message was successfully received and that the CSI-RS resource in the DCI message is used in the measurement.

In a further embodiment, periodic CSI reports using PUCCH are computed based on the CSI-RS resource indicated in an LTE Medium Access Control (MAC) control element. The UE can be expected to use the CSI-RS resource indicated in the MAC control element no later than a predetermined number of subframes after transmitting a Hybrid Automatic Repeat Request Acknowledgement (HARQ-ACK) on PUCCH to the transport block containing the MAC control element. In this way, the maximum length of the ambiguity period in which the prior CSI-RS would be measured can be determined, and so subframes in which the CSI-RS resource indicated by the MAC control element should be used for CSI reports can be identified. Additionally or alternatively, the UE may provide an indication confirming which CSI-RS resource is measured, the indication comprising an index of the measured CSI-RS resource or alternatively a bit confirming that the MAC control element was successfully received and that the CSI-RS resource is used in the measurement.

In some further embodiments of the eNB, the CSI resources configured to the UE are transmitted in adjacent beams. Hence, the eNB can dynamically change the CSI measurement reports from the UE for the current beam serving the UE and for the neighboring beams of this serving beam.

Figure 5:
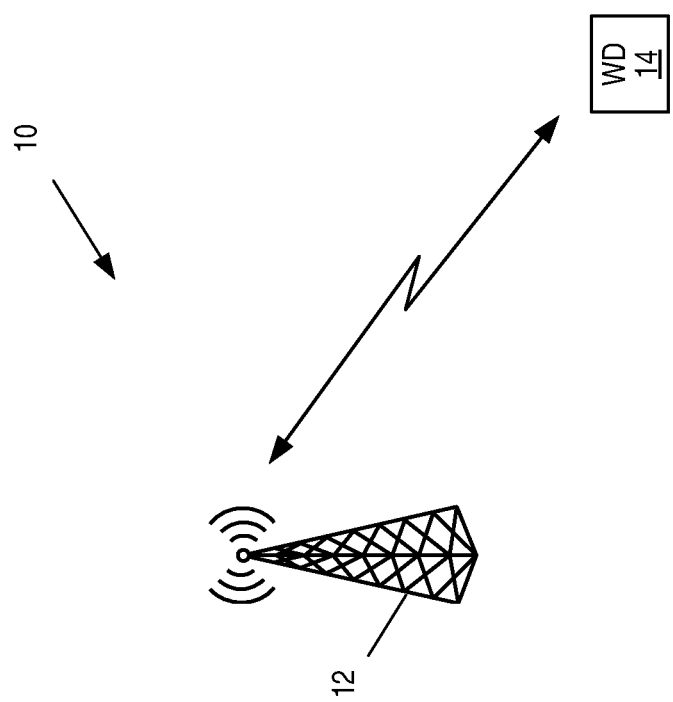
FIG. 5 illustrates one example of a cellular communications network implementing flexible Channel State Information (CSI) feedback according to some embodiments of the present disclosure.

As discussed above, embodiments of the present disclosure are implemented in a cellular communications network 10, such as that illustrated in FIG. 5. As illustrated, the cellular communications network 10 includes a base station 12 (e.g., an eNB) and a wireless device 14 (e.g., a UE). Note that while the base station 12 is described as performing some of the functionality disclosed herein, the concepts are equally applicable to any type of radio access node that desires to configure CSI measurements by the wireless device 14. The base station 12 is connected to a core network (not shown).

Figure 6:
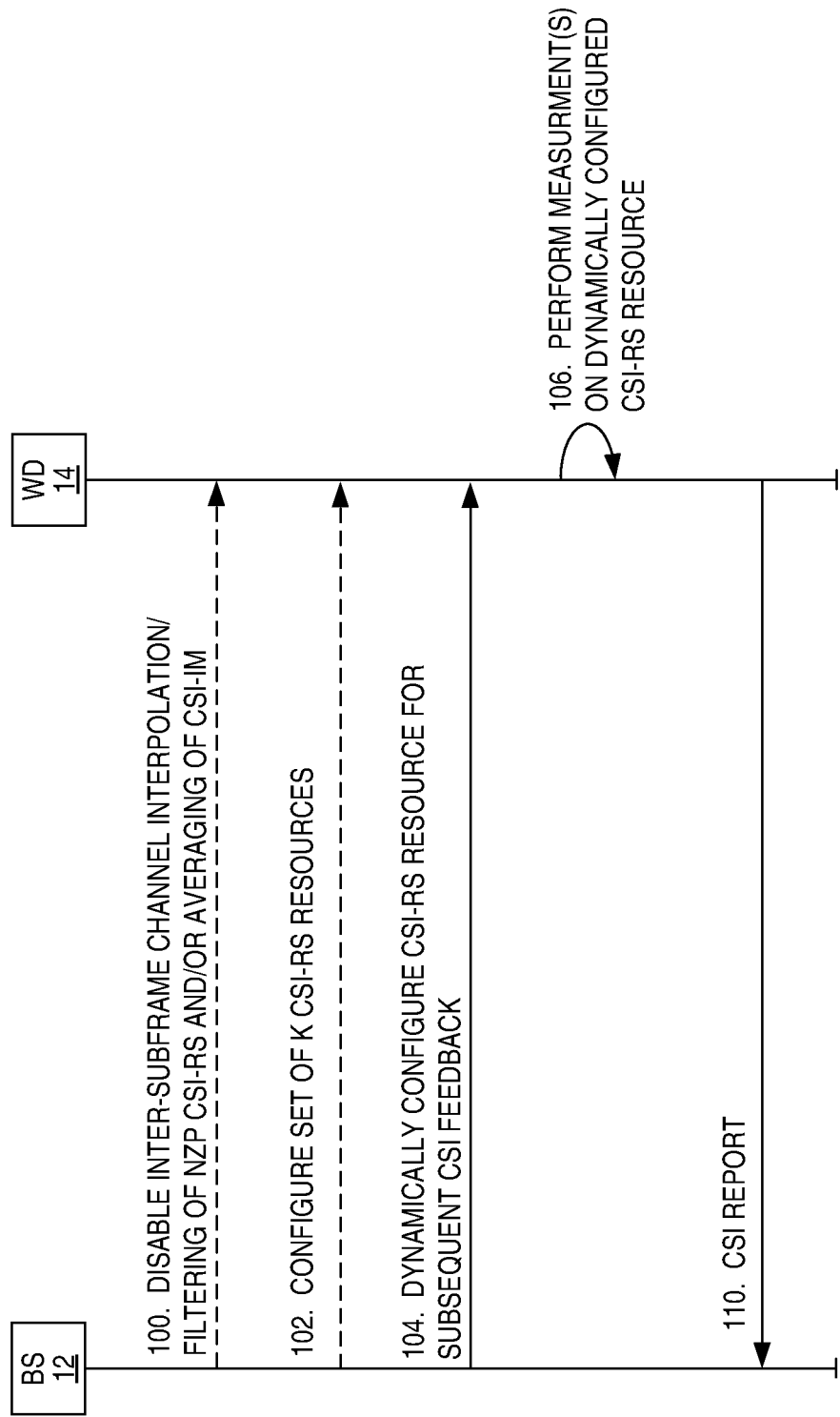
FIG. 6 illustrates the operation of the base station and the wireless device of FIG. 5 according to some embodiments of the present disclosure.

FIG. 6 illustrates the operation of the base station 12 and the wireless device 14 according to some embodiments of the present disclosure. As discussed above, in some embodiments, the base station 12 disables the inter-subframe channel interpolation/filtering of the NZP CSI-RS and/or averaging of CSI-IM belonging to a CSI process of the wireless device 14 (step 100). Note that, in FIG. 6, step 100 is optional as indicated by the dashed line. Notably, as will be appreciated by one of ordinary skill in the art upon reading this disclosure, inter-subframe interpolation and inter-subframe filtering are two different techniques used for inter-subframe CSI-RS based channel estimation. Inter-subframe interpolation uses CSI-RS estimates across subframes to interpolate additional CSI-RS estimates. Conversely, inter-subframe filtering filters, or averages, CSI-RS estimates across subframes. As such, "inter-subframe interpolation/ filtering" refers to inter-subframe interpolation and/or inter-subframe filtering. In some embodiments, the base station 12 disables inter-subframe interpolation/filtering of NZP CSI-RS and/or averaging of CSI-IM in an uplink grant to the wireless device 14. In some embodiments, the base station 12 accomplishes this in an RRC message to the wireless device 14. In some embodiments, whether or not channel interpolation is done is encoded in an information element sent to the wireless device 14.

In some embodiments, the base station 12 configures the wireless device 14 with a set of K CSI-RS resources by higher layer signaling, e.g. by using an RRC message (step 102). Note that, in FIG. 6, step 102 is optional as indicated by the dashed line. The base station 12 then dynamically configures one (or more) of the CSI-RS resources in the set of K CSI-RS resources to use for subsequent CSI feedback (step 104). As used herein, a dynamic configuration is one that changes on a subframe or at least frame level (e.g., from one subframe to another). In step 202, the base station 12 dynamically indicates which CSI-RS resource(s) that the wireless device 14 is to perform measurements on for subsequent CSI feedback. In some embodiments, the indication includes an indication of at least one CSI-RS resource of the K CSI-RS resources to be used by the wireless device 14. In some embodiments, this is accomplished with an uplink grant to wireless device 14.

The wireless device 14 then measures the indicated CSI-RS (step 106). In other words, the wireless device 14 performs one or more measurements on the one or more CSI-RS resources dynamically configured in step 104. The wireless device 14 then reports the selected CSI-RS to the base station 12 via a CSI report (step 110). In some embodiments, this is a periodically scheduled CSI feedback. In some embodiments, this is an aperiodic CSI feedback.

Figure 7:
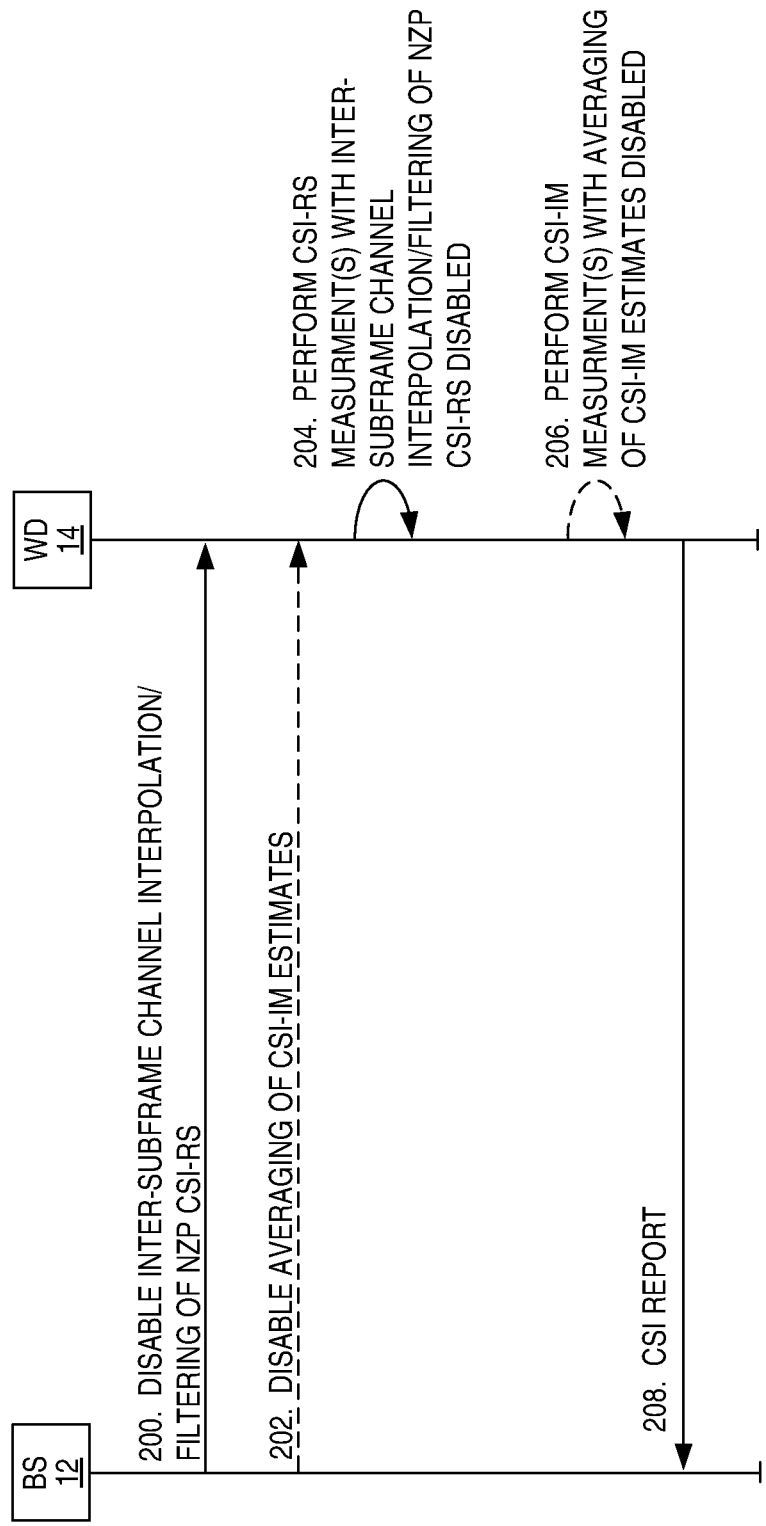
FIG. 7 illustrates the operation of the base station and the wireless device of FIG. 5 to provide disabling of inter-subframe interpolation/filtering of CSI-RS estimates according to some embodiments of the present disclosure.

FIGS. 7 through 13 illustrate various embodiments described above. In particular, FIG. 7 illustrates the operation of the base station 12 and the wireless device 14 to enable disablement of inter-subframe interpolation/filtering of NZP CSI-RS measurements according to some embodiments of the present disclosure. As illustrated, the base station 12 disables inter-subframe channel interpolation/filtering of NZP CSI-RS at the wireless device 14 (step 200) Notably, in this embodiment, disabling of inter-subframe channel interpolation/filtering of NZP CSI-RS is performed on a per wireless device basis. The base station 12 may disable inter-subframe channel interpolation/filtering of NZP CSI-RS at the wireless device 14 in response to some triggering event, e.g., an increase in cell load, an increase in the number of beams transmitted by the base station 12, etc. However, the triggering event can be any suitable triggering event. The base station 12 disables inter-subframe channel interpolation/filtering of NZP CSI-RS at the wireless device 12 by, in some embodiments, transmitting an indication to the wireless device 14 that the wireless device 14 is not allowed to perform inter-subframe channel interpolation/filtering of NZP CSI-RS. This indication may be transmitted using any suitable signaling such as, for example, higher layer signaling (e.g., RRC signaling).

In some embodiments, the base station 12 disables inter-subframe channel interpolation/filtering of NZP CSI-RS at the wireless device 14 for one or more particular CSI processes of the wireless device 12. For instance, the base station 12 includes an indication that inter-subframe channel interpolation/filtering of NZP CSI-RS at the wireless device 14 is to be disabled (i.e., not allowed) for a particular CSI process within an RRC information element used to configure that CSI process. In this manner, the base station 12 can separately disable or enable inter-subframe channel interpolation/filtering of NZP CSI-RS for multiple CSI processes configured for the wireless device 14. In other embodiments, the base station 12 disables inter-subframe channel interpolation/filtering of NZP CSI-RS at the wireless device 14 for multiple CSI processes (e.g., two or more or even all CSI processes) using a single indicator.

Optionally, in some embodiments, the base station 12 may also disable averaging of CSI-IM estimates at the wireless device (step 202). Notably, while averaging of CSI-IM estimates is described as being disabled in some of the embodiments disclosed herein, the present disclosure is not limited to averaging. Averaging is just one example of how CSI-IM estimates can be combined across subframes. As such, in this regard, any combining (e.g., filtering or averaging) of multiple CSI-IM estimates across subframes may be disabled. In other words, the base station 12 may also transmit an indication to the wireless device 14 that indicates that the wireless device 14 is not to perform averaging of CSI-IM estimates. This indication may be provided via higher layer signaling, e.g., RRC signaling. As discussed above with respect to step 200, the indication to disable averaging of CSI-IM estimates may be provided separately for each of multiple CSI processes at the wireless device 14 or a single indication may be used for multiple or even all CSI processes.

In response to receiving the indication from the base station 12 in step 200, the wireless device 14 performs CSI-RS measurement(s) with inter-subframe channel interpolation/filtering of NZP CSI-RS disabled (step 204). Similarly, if averaging of CSI-IM estimates has been disabled, the wireless device 14 performs CSI-IM measurement(s) with averaging of CSI-IM estimates disabled (step 206). The wireless device 14 then provides CSI feedback to the base station 12 via a CSI report(s) determined from the measurements (step 208). Notably, if there are multiple CSI processes at the wireless device 14, then a separate CSI report for each CSI process may be used to report the CSI feedback to the base station 12. Also, if triggered (aperiodic) CSI reporting is used (e.g., using PUSCH in LTE), the wireless device 14 can send multiple CSI reports together (stacked) in a single message (e.g., a single PUSCH message in LTE).

Figure 8:
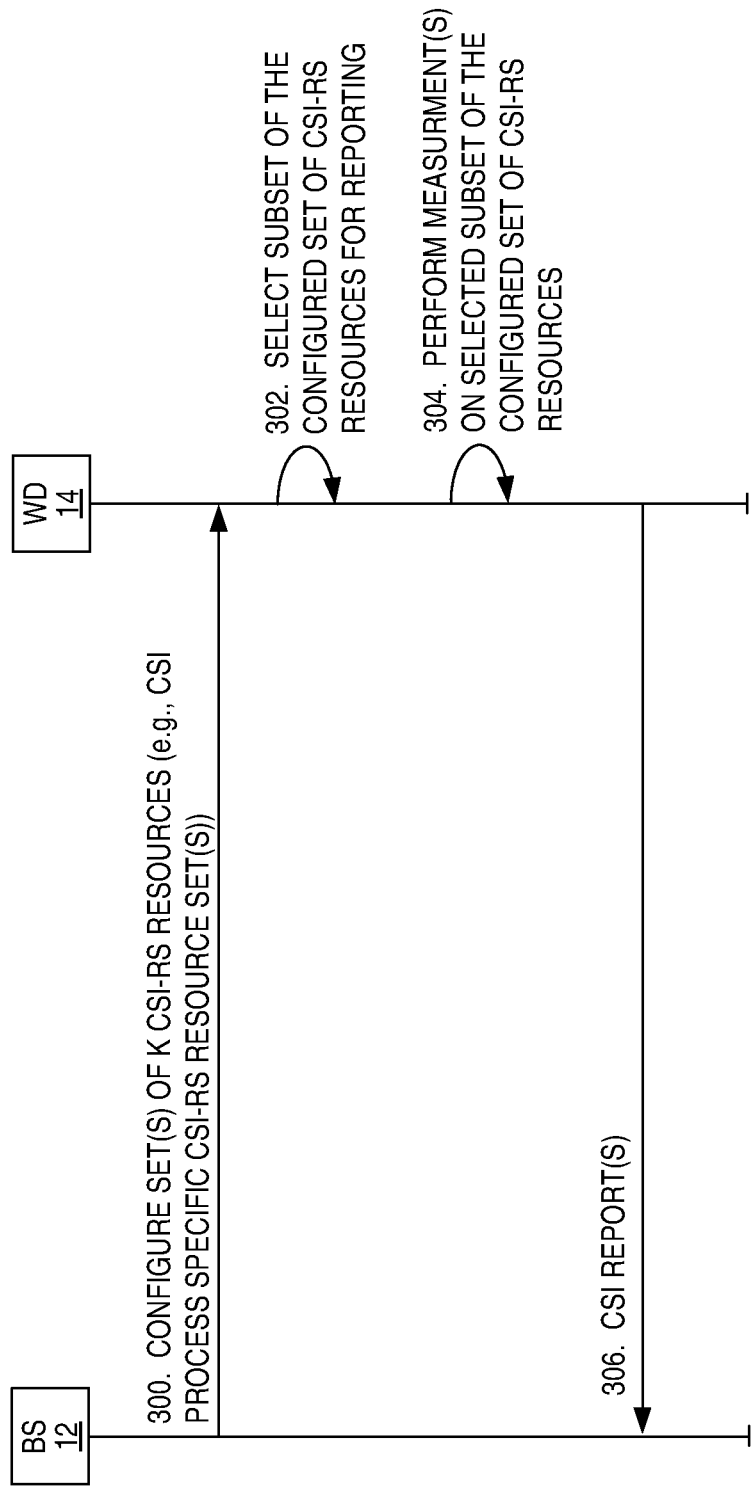
FIG. 8 illustrates the operation of the base station and the wireless device of FIG. 5 to provide dynamic CSI feedback according to some embodiments of the present disclosure.

FIG. 8 illustrates the operation of the base station 12 and the wireless device 14 according to some embodiments of the present disclosure in which the base station 12 configures the wireless device 14 with a set of K CSI-RS resources and the wireless device 14 selects a subset of the configured set of CSI-RS resources on which to measure for CSI feedback. In some embodiments, the process of FIG. 8 is utilized together with the process of FIG. 7 (i.e., inter-subframe channel interpolation/filtering can be disabled for one or more or even all CSI processes).

As illustrated, the base station 12 configures the wireless device 14 with one or more sets of K CSI-RS resources (step 300). This configuration is a static or semi-static configuration. For instance, this configuration may be made semi-statically via higher layer signaling such as, for example, RRC signaling. Further, a single set of K CSI-RS resources may be configured for all CSI processes of the wireless device 14 (i.e., the same set of K CSI-RS resources is used for all CSI processes). However, in other embodiments, a separate set of CSI-RS resources may be configured for each CSI process. In some particular embodiments, the base station 12 transmits beamformed CSI-RS, and the set of K CSI-RS resources configured for a CSI process or all CSI processes corresponds to K different beam directions or beams as seen by the base station 12. In this case, K may be, for example, 20 since 20 two-port CSI-RSs can be transmitted in a single subframe (3GPP TS 36.211 V12.3.0). Further, the K beams may include a serving beam of the wireless device 14 and a number of neighboring beams of the serving beam of the wireless device 14.

The wireless device 14 then dynamically selects a subset of the configured set(s) of CSI-RS resources for CSI reporting (step 302). In embodiments where a different set of CSI-RS resources is configured for each CSI-RS process, for each CSI process, the wireless device 14 dynamically selects a subset of the configured set of CSI-RS resources for CSI reporting for that CSI process. This selection could, for example, be based on estimates of channel strengths for the configured CSI-RS resources (e.g., the subset could be selected to correspond to the N strongest channels, where $0<N\leq K$). The wireless device 14 performs measurement(s) on the selected subset of the configured set(s) of CSI-RS resources (step 304) and provides CSI feedback based on the measurements via a CSI report(s) (step 306). Notably, the wireless device 14 may include an indication of the selected CSI-RS resource(s) in the CSI report(s) or provide such an indication to the base station 12 via a separate message(s). Steps 302-306 may be repeated periodically (e.g., for periodic CSI reporting) or aperiodically (for aperiodic CSI reporting). Conversely, the configuration of step 300 may be performed infrequently or only once.

Figure 9:
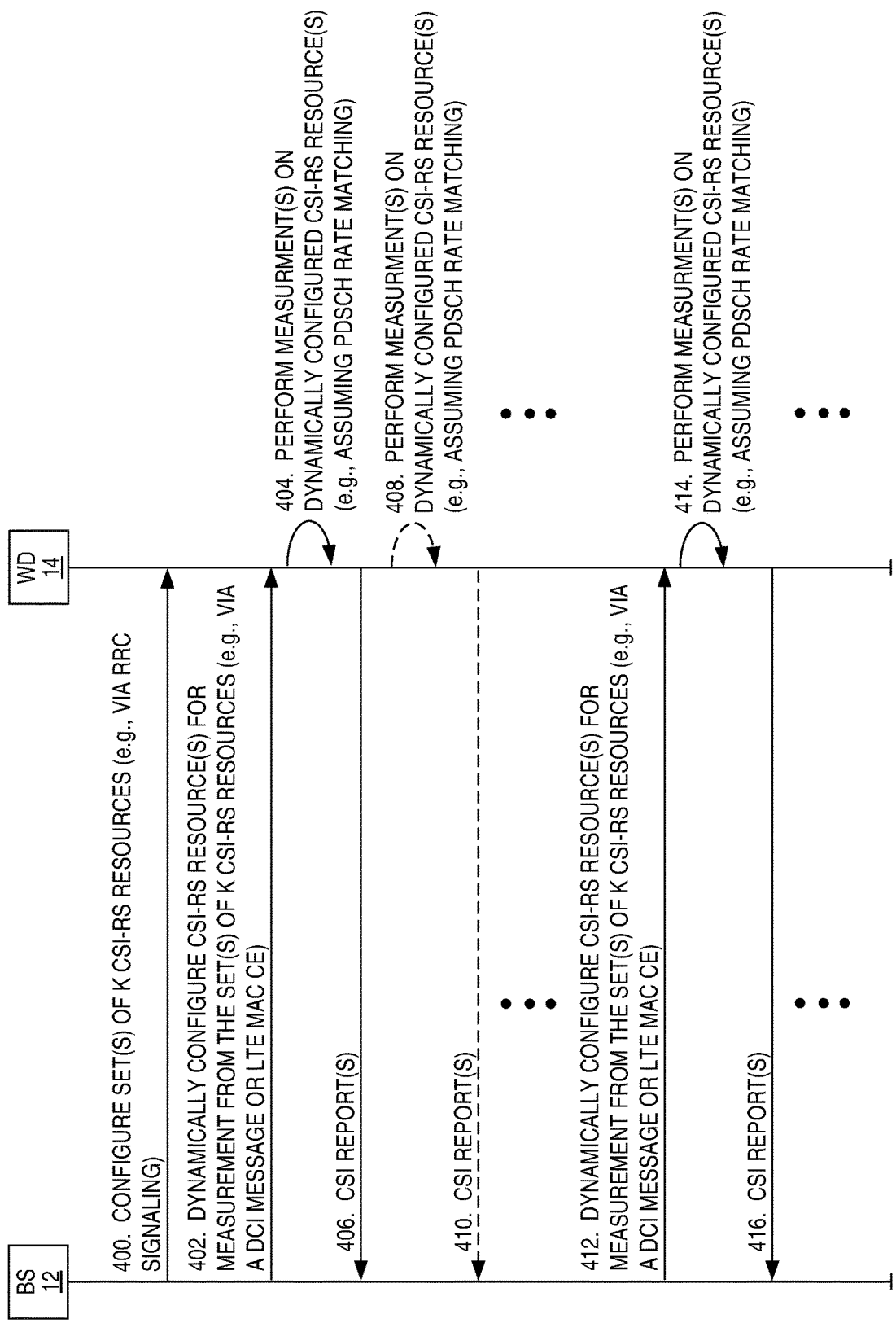
FIG. 9 illustrates the operation of the base station and the wireless device of FIG. 5 to provide dynamic CSI feedback via dynamic CSI-RS resource configuration according to some embodiments of the present disclosure.

FIG. 9 illustrates the operation of the base station 12 and the wireless device 14 to enable dynamic CSI reporting according to some embodiments of the present disclosure. As illustrated, the base station 12 configures the wireless device 14 with one or more sets of K CSI-RS resources (step 400). This configuration is a static or semi-static configuration. For instance, this configuration may be made semi-statically via higher layer signaling such as, for example, RRC signaling. Further, a single set of K CSI-RS resources may be configured for all CSI processes of the wireless device 14 (i.e., the same set of K CSI-RS resources is used for all CSI processes). However, in other embodiments, a separate set of CSI-RS resources may be configured for each CSI process. In some particular embodiments, the base station 12 transmits beamformed CSI-RS, and the set of K CSI-RS resources configured for a CSI process or all CSI processes corresponds to K different beam directions or beams as seen by the base station 12. In this case, K may be, for example, 20 since 20 two-port CSI-RSs can be transmitted in a single subframe (3GPP TS 36.211 V12.3.0). Further, the K beams may include a serving beam of the wireless device 14 and a number of neighboring beams of the serving beam of the wireless device 14.

After configuring the set(s) of K CSI-RS resources, the base station 12 dynamically configures CSI-RS resource(s) for measurement from the set(s) of CSI-RS resources (step 402). This dynamic configuration is performed by dynamically transmitting an indication(s) to the wireless device 14 of which CSI-RS resource(s) from the set(s) of CSI-RS resources configured for the wireless device 14 are to be used for measurement. In some embodiments, the dynamic configuration is transmitted via an uplink scheduling grant message, a downlink assignment, a message on a dedicated control channel, a DCI message, or a LTE MAC Control Element (CE). The dynamic configuration is used for at least one subsequent CSI report. In some embodiments, the dynamic configuration is to be used for only one subsequent CSI report. In other embodiments, the dynamic configuration is to be used for CSI reports until a new dynamic configuration is received.

After receiving the dynamic configuration, the wireless device 14 performs measurement(s) on the dynamically configured CSI-RS resource(s) (step 404) and transmits a corresponding CSI report(s) to the base station 12 (step 406). Notably, the wireless device 14 may include an indication of the CSI-RS resource(s) used for the CSI report(s) (or some other indication that the dynamically configured CSI-RS resource(s) were used for the CSI report(s)) in the CSI report(s) or provide such an indication to the base station 12 via a separate message(s). The CSI report(s) may be a periodic CSI report(s) or aperiodic CSI report(s). As discussed above, the dynamic configuration is used for only one CSI report. In this case, the process proceeds to step 412 discussed below. However, in other embodiments, the dynamic configuration applies until a new dynamic configuration is received. In this regard, the wireless device 14 continues to perform measurement(s) and transmit corresponding CSI reports, periodically or aperiodically, until a new dynamic configuration is received (steps 408 and 410). Once a new dynamic configuration is transmitted by the base station 12 and received by the wireless device 14 (step 412), the wireless device 14 performs measurement(s) on the newly configured CSI-RS resource(s) and reports the corresponding CSI report(s) to the base station 12 (step 414 and 416). The process continues in this manner.

Notably, in some embodiments when performing the measurements on the dynamically configured CSI-RS resource(s), the wireless device 14 assumes PDSCH rate matching around CSI-RS and CRS. PDSCH rate matching around CSI-RS is, in particular, where PDSCH is not mapped to any Resource Elements (REs) in the union of the ZP and NZP CSI-RS resources in the configured set(s) of CSI-RS resources. In other words, when mapping PDSCH to REs for transmission at the base station 12, the PDSCH is not mapped to any REs that are included in the ZP and NZP CSI-RS resources in the configured set(s) of CSI-RS resources.

Figure 10:
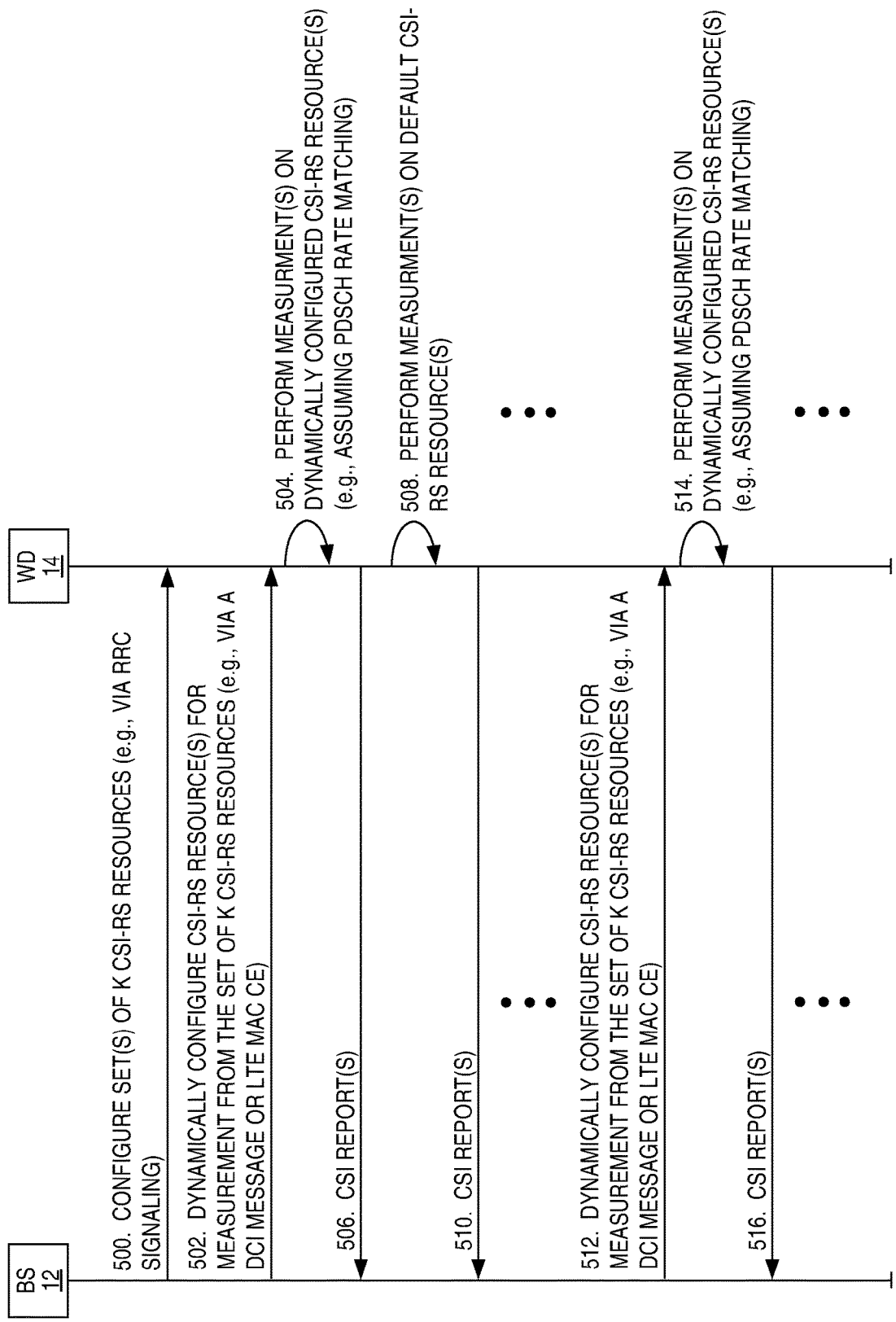
FIG. 10 illustrates the operation of the base station and the wireless device of FIG. 5 to provide dynamic CSI feedback via dynamic CSI-RS resource configuration according to some other embodiments of the present disclosure.

FIG. 10 illustrates the operation of the base station 12 and the wireless device 14 according to some embodiments in which the CSI-RS resource configuration reverts back to some default configuration after CSI reporting on a dynamically configured CSI-RS resource(s) is complete. In this example, steps 500-506 are the same as steps 400-406 of FIG. 9 and, as such, the details are not repeated. After transmitting the CSI report(s) based on the dynamically configured CSI-RS resource(s) in step 506, rather than continuing to report using the same dynamically configured CSI-RS resources, the wireless device 14 reverts to a default CSI-RS resource(s). In particular, the wireless device 14 performs measurement(s) on the default CSI-RS resource(s) (step 508) and transmits a corresponding CSI report(s) to the base station 12 (step 510). The CSI report(s) may be a periodic CSI report(s) or aperiodic CSI report(s). In this example, the wireless device 14 continues to perform measurement(s) and transmit corresponding CSI reports, periodically or aperiodically, based on the default CSI-RS resource(s) until a new dynamic configuration is transmitted by the base station 12 and received by the wireless device 14 (step 512). Once a new dynamic configuration is received by the wireless device 14, the wireless device 14 performs measurement(s) on the newly configured CSI-RS resource(s) and reports the corresponding CSI report(s) to the base station 12 (steps 514 and 516). The process continues in this manner. Notably, in some embodiments when performing the measurements on the dynamically configured CSI-RS resource(s), the wireless device 14 assumes PDSCH rate matching around CSI-RS and CRS.

Figure 11:
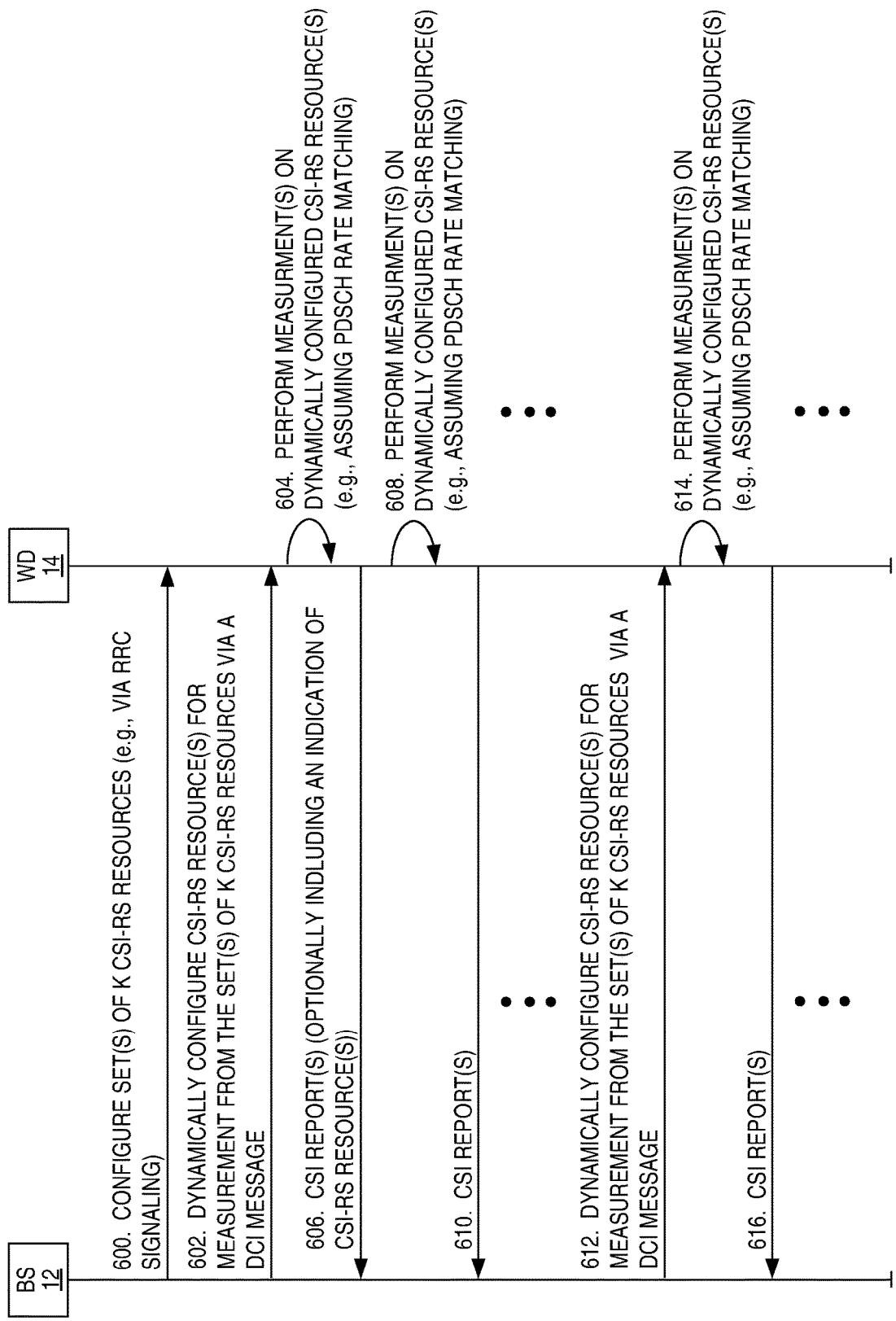
FIG. 11 illustrates the operation of the base station and the wireless device of FIG. 5 to provide dynamic CSI feedback via dynamic CSI-RS resource configuration using Downlink Control Information (DCI) messages according to some other embodiments of the present disclosure.

FIG. 11 illustrates an embodiment in which the CSI-RS resource(s) is dynamically configured via a DCI message. Using the DCI message for the dynamic configuration may be particularly well-suited for aperiodic CSI reporting, but is not limited thereto. As illustrated, the base station 12 configures the wireless device 14 with one or more sets of K CSI-RS resources (step 600). As discussed above, this configuration is a static or semi-static configuration. For instance, this configuration may be made semi-statically via higher layer signaling such as, for example, RRC signaling. Further, a single set of K CSI-RS resources may be configured for all CSI processes of the wireless device 14 (i.e., the same set of K CSI-RS resources is used for all CSI processes). However, in other embodiments, a separate set of CSI-RS resources may be configured for each CSI process. In some particular embodiments, the base station 12 transmits beamformed CSI-RS, and the set of K CSI-RS resources configured for a CSI process or all CSI processes corresponds to K different beam directions or beams as seen by the base station 12. In this case, K may be, for example, 20 since 20 two-port CSI-RSs can be transmitted in a single subframe (3GPP TS 36.211 V12.3.0). Further, the K beams may include a serving beam of the wireless device 14 and a number of neighboring beams of the serving beam of the wireless device 14.

After configuring the set(s) of K CSI-RS resources, the base station 12 dynamically configures CSI-RS resource(s) for measurement from the set(s) of CSI-RS resources via a DCI message (step 602). The DCI message includes an indication of configured CSI-RS resource(s) from the configured set(s) of CSI-RS resources (e.g., an index or indices). After receiving the dynamic configuration, the wireless device 14 performs measurement(s) on the dynamically configured CSI-RS resource(s) (step 604) and transmits a corresponding CSI report(s) to the base station 12 (step 606), as discussed above. While not being limited hereto, in this example, the wireless device 14 continues to use the same dynamically configured CSI-RS resource(s) for one or more subsequent CSI reports (not shown). This may be the case where, for example, CSI reporting is periodic. However, in other embodiments, CSI reporting is aperiodic and the CSI-RS resource(s) to use may be dynamically configured for each aperiodic CSI report, for example. Once a new dynamic configuration is transmitted by the base station 12 and received by the wireless device 14 (step 612), the wireless device 14 performs measurement(s) on the newly configured CSI-RS resource(s) and reports the corresponding CSI report(s) to the base station 12 (steps 614 and 616). The process continues in this manner. Notably, in some embodiments when performing the measurements on the dynamically configured CSI-RS resource(s), the wireless device 14 assumes PDSCH rate matching around CSI-RS.

Figure 12:
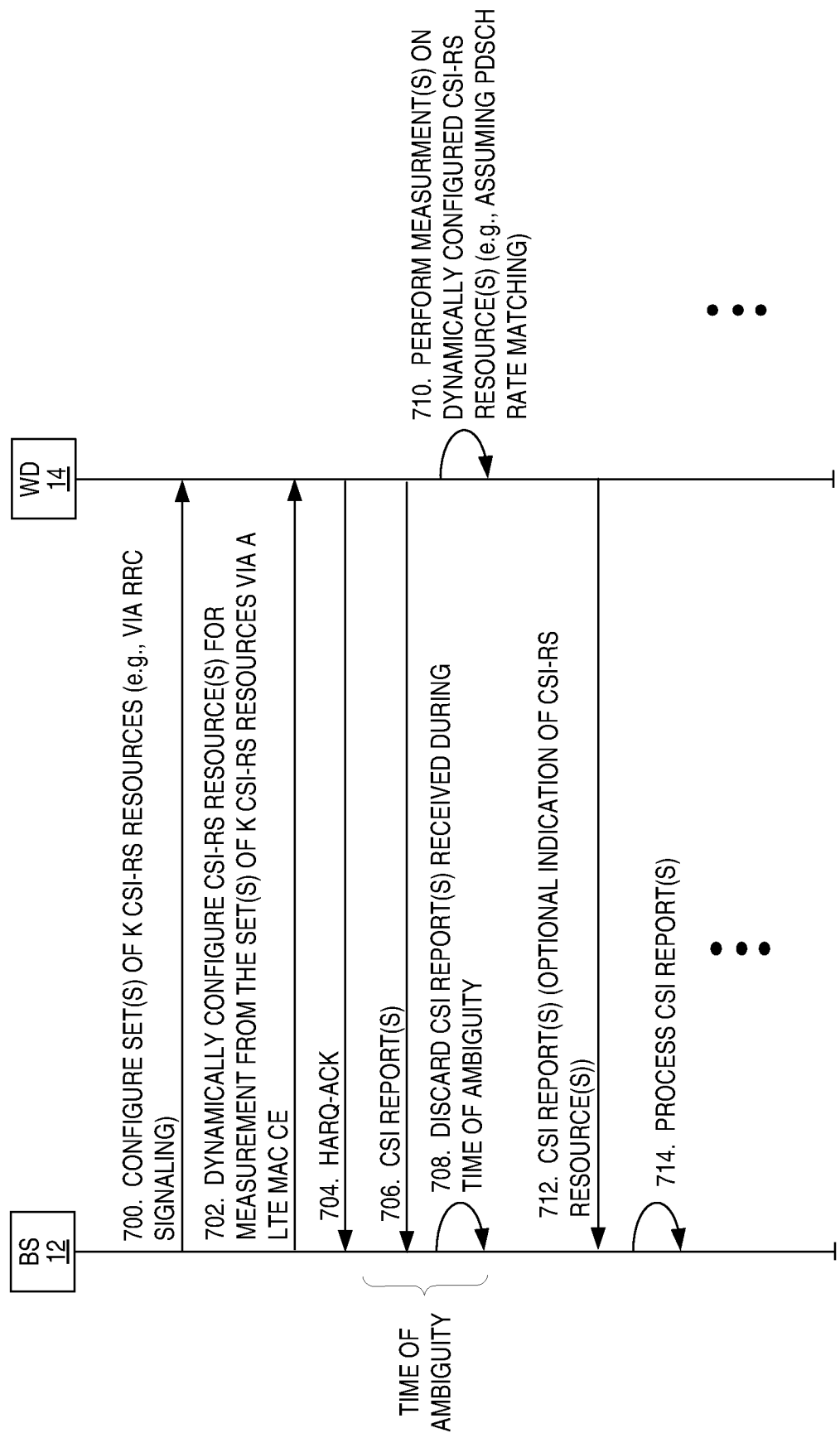
FIG. 12 illustrates the operation of the base station and the wireless device of FIG. 5 to provide dynamic CSI feedback via dynamic CSI-RS resource configuration using Long Term Evolution (LTE) Medium Access Control (MAC) Control Elements (CEs) according to some other embodiments of the present disclosure.

FIG. 12 illustrates an embodiment in which the CSI-RS resource(s) is dynamically configured via a LTE MAC CE. In this particular example, CSI reporting is periodic; however, the present disclosure is not limited thereto. As illustrated, the base station 12 configures the wireless device 14 with one or more sets of K CSI-RS resources (step 700). As discussed above, this configuration is a static or semi-static configuration. For instance, this configuration may be made semi-statically via higher layer signaling such as, for example, RRC signaling. Further, a single set of K CSI-RS resources may be configured for all CSI processes of the wireless device 14 (i.e., the same set of K CSI-RS resources is used for all CSI processes). However, in other embodiments, a separate set of CSI-RS resources may be configured for each CSI process. In some particular embodiments, the base station 12 transmits beamformed CSI-RS, and the set of K CSI-RS resources configured for a CSI process or all CSI processes corresponds to K different beam directions or beams as seen by the base station 12. In this case, K may be, for example, 20 since 20 two-port CSI-RSs can be transmitted in a single subframe (3GPP TS 36.211 V12.3.0). Further, the K beams may include a serving beam of the wireless device 14 and a number of neighboring beams of the serving beam of the wireless device 14.

After configuring the set(s) of K CSI-RS resources, the base station 12 dynamically configures CSI-RS resource(s) for measurement from the set(s) of CSI-RS resources via a LTE MAC CE (step 702). The LTE MAC CE includes an indication of configured CSI-RS resource(s) from the configured set(s) of CSI-RS resources (e.g., an index or indices). In response to receiving the dynamic configuration, the wireless device 14 sends an acknowledgement (e.g., a HARQ-ACK) to the base station 12 to confirm receipt of the transport block containing the LTE MAC CE (step 704).

There is a certain amount of time that it takes the wireless device 14 to effect the dynamic configuration of the CSI-RS resources, that is to begin measuring and reporting CSI measurements of the CSI-RS resources. Particularly for periodic CSI reporting, this results in a time of ambiguity in which any CSI reports received from the wireless device 14 are inaccurate (i.e., are based on measurements on the previously configured CSI-RS resource(s) rather than the newly configured CSI-RS resource(s)). As such, in this example, the base station 12 discards any CSI reports received from the wireless device 14 during a predefined amount of time after receiving the acknowledgement from the wireless device 14 in step 704 (steps 706 and 708). This predefined amount of time is greater than or equal to the amount of time that it takes for the wireless device 14 to effect the dynamic configuration of the CSI-RS resource received in step 702.

In response to receiving the dynamic configuration in step 702, the wireless device 14 performs measurement(s) on the dynamically configured CSI-RS resource(s) (step 710) and transmits a corresponding CSI report(s) to the base station 12 (step 712), as discussed above. Notably, the time needed by the wireless device 14 to perform the measurement(s) in step 710 may be part of the time of ambiguity discussed above. Notably, the wireless device 14 may include an indication of the CSI-RS resource(s) used for the CSI report(s) (or some other indication that the dynamically configured CSI-RS resource(s) were used for the CSI report(s)) in the CSI report(s) or provide such an indication to the base station 12 via a separate message(s). In this case, now that the predefined amount of time since receiving the acknowledgement in step 704 has expired, the base station 12 can be certain that the CSI report is based on the CSI-RS resource(s) configured in step 702. As such, the base station 12 processes the CSI report(s) (e.g., to select transmission parameters for the downlink to the wireless device 14 in the conventional manner) (step 714). Notably, in some embodiments, the CSI report(s) include an indication that that the dynamically configured CSI-RS resource(s) were used for the CSI report(s). This indication may be, for example, an indication (e.g., an index) of the CSI-RS resource(s) used for the CSI report(s) or any other suitable indication.

At this point, as discussed above, the wireless device 14 may continue to use the same dynamically configured CSI-RS resource(s) for one or more subsequent CSI reports (not shown). This may be the case where, for example, CSI reporting is periodic. However, in other embodiments, CSI reporting is aperiodic, and the CSI-RS resource(s) to use may be dynamically configured for each aperiodic CSI report, for example. In other embodiments, the wireless device 14 may revert to some default CSI-RS resource(s) until a new dynamic configuration is received. Notably, in some embodiments when performing the measurements on the dynamically configured CSI-RS resource(s), the wireless device 14 assumes PDSCH rate matching around CSI-RS.

Figure 13:
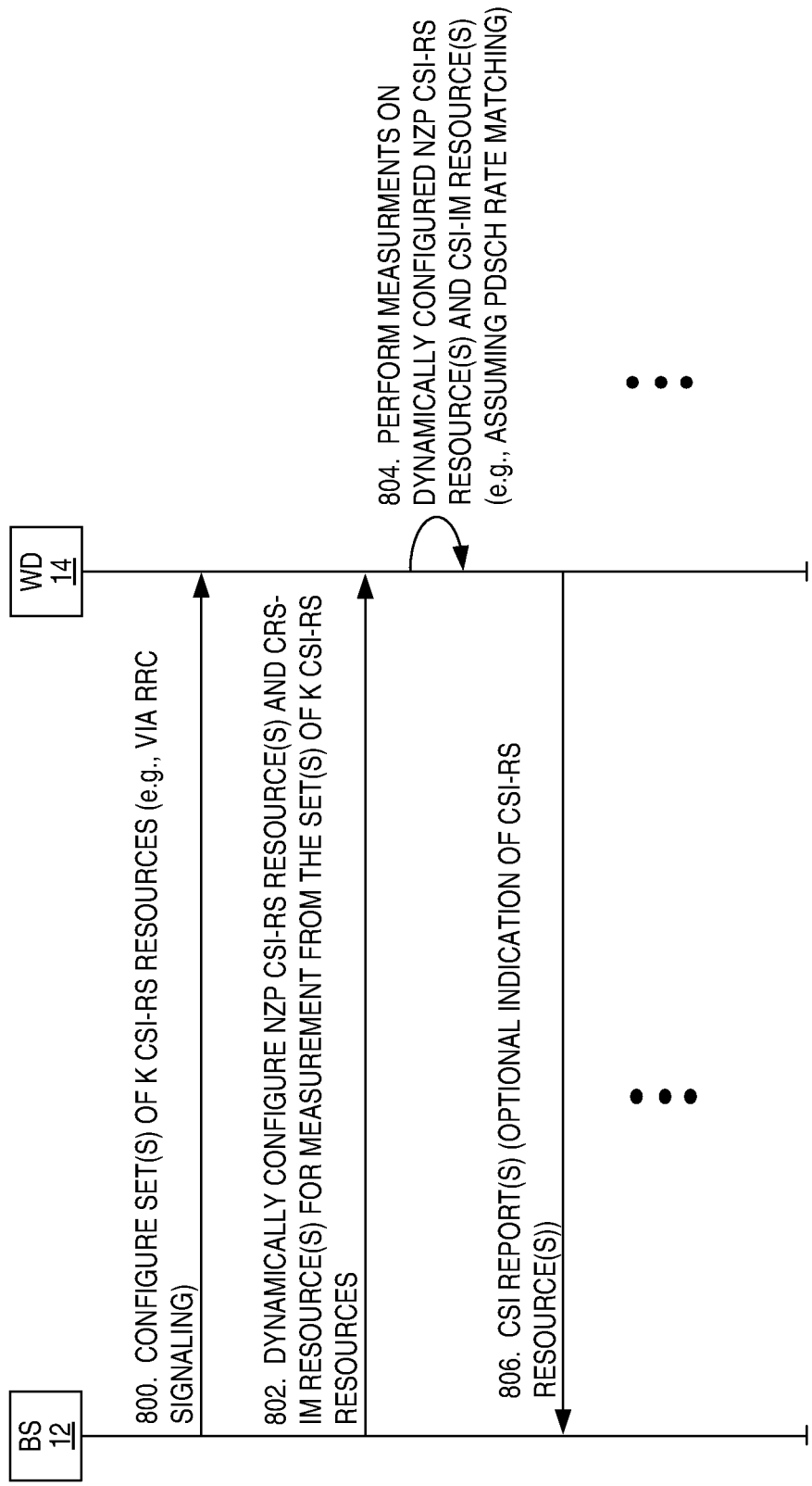
FIG. 13 illustrates the operation of the base station and the wireless device of FIG. 5 to provide dynamic CSI feedback via dynamic Non-Zero Power (NZP) CSI-RS and CSI Interference Measurement (CSI-IM) resource configuration according to some embodiments of the present disclosure.

While the embodiments described above with respect to FIGS. 9-12 focus on dynamic configuration of CSI-RS resources in general, it should be noted that these CSI-RS resources are, in some embodiments, NZP CSI-RS resources and, in other embodiments, NZP CSI-RS resources and/or CSI-IM resources. In this regard, FIG. 13 illustrates the operation of the base station 12 to dynamically configure NZP CSI-RS resource(s) and CSI-IM resource(s) according to some embodiments of the present disclosure. As illustrated, the base station 12 configures the wireless device 14 with one or more sets of K CSI-RS resources (step 800). As discussed above, this configuration is a static or semi-static configuration. For instance, this configuration may be made semi-statically via higher layer signaling such as, for example, RRC signaling. Further, a single set of K CSI-RS resources may be configured for all CSI processes of the wireless device 14 (i.e., the same set of K CSI-RS resources is used for all CSI processes). However, in other embodiments, a separate set of CSI-RS resources may be configured for each CSI process. In some particular embodiments, the base station 12 transmits beamformed CSI-RS, and the set of K CSI-RS resources configured for a CSI process or all CSI processes corresponds to K different beam directions or beams as seen by the base station 12. In this case, K may be, for example, 20 since 20 two-port CSI-RSs can be transmitted in a single subframe (3GPP TS 36.211 V12.3.0). Further, the K beams may include a serving beam of the wireless device 14 and a number of neighboring beams of the serving beam of the wireless device 14. In some embodiments, the sets of CSI-RS resources include a first set of NZP CSI-RS resources and a second set of CSI-IM resources (which may also be referred to as ZP CSI-RS resources).

After configuring the set(s) of K CSI-RS resources, the base station 12 dynamically configures NZP CSI-RS resource(s) and CSI-IM resource(s) for measurement from the set(s) of CSI-RS resources (step 802). The details for the dynamic configuration are as discussed above. For instance, the dynamic configuration may include different NZP CSI-RS resources and CSI-IM resources for each of two or more CSI processes. In other words, the dynamic configuration may be CSI process specific. Further, the dynamic configuration may be performed by transmitting an appropriate indication(s) in, e.g., a DCI message or a LTE MAC CE, for example. In some embodiments, the set(s) of CSI-RS resources configured in step 800 include a set of NZP CSI-RS resources and a set of CSI-IM resources. Then, in step 802, the base station 12 dynamically configures one or more NZP CSI-RS resources for measurement from the set of NZP CSI-RS resources (e.g., one NZP CSI-RS resource for each CSI process) and one or more CSI-IM resources for interference measurement from the set of CSI-IM resources (e.g., one CSI-IM resource for each CSI process).

In response to receiving the dynamic configuration, the wireless device 14 performs measurement(s) on the dynamically configured NZP CSI-RS resource(s) and CSI-IM resource(s) (step 804). The measurement(s) on the NZP CSI-RS resource(s) is measurement(s) of a desired signal, whereas the measurement(s) on the CSI-IM resource(s) is measurement(s) of interference, as will be appreciated by one of ordinary skill in the art upon reading this disclosure. The wireless device 14 transmits a corresponding CSI report(s) to the base station 12 based on the measurements on the dynamically configured CSI-RS resource(s) and CSI-IM resource(s) (step 806). Notably, the wireless device 14 may include an indication of the NZP CSI-RS and CSI-IM resource(s) used for the CSI report(s) (or some other indication that the dynamically configured NZP CSI-RS and CSI-IM resource(s) were used for the CSI report(s)) in the CSI report(s) or provide such an indication to the base station 12 via a separate message(s).

At this point, as discussed above, the wireless device 14 may continue to use the same dynamically configured NZP CSI-RS resource(s) and CSI-IM resource(s) for one or more subsequent CSI reports (not shown). This may be the case where, for example, CSI reporting is periodic. However, in other embodiments, CSI reporting is aperiodic, and the CSI-RS resource(s) to use may be dynamically configured for each aperiodic CSI report, for example. In other embodiments, the wireless device 14 may revert to some default CSI-RS resource(s) until a new dynamic configuration is received. Notably, in some embodiments when performing the measurements on the dynamically configured CSI-RS resource(s), the wireless device 14 assumes PDSCH rate matching around CSI-RS.

Figure 14:
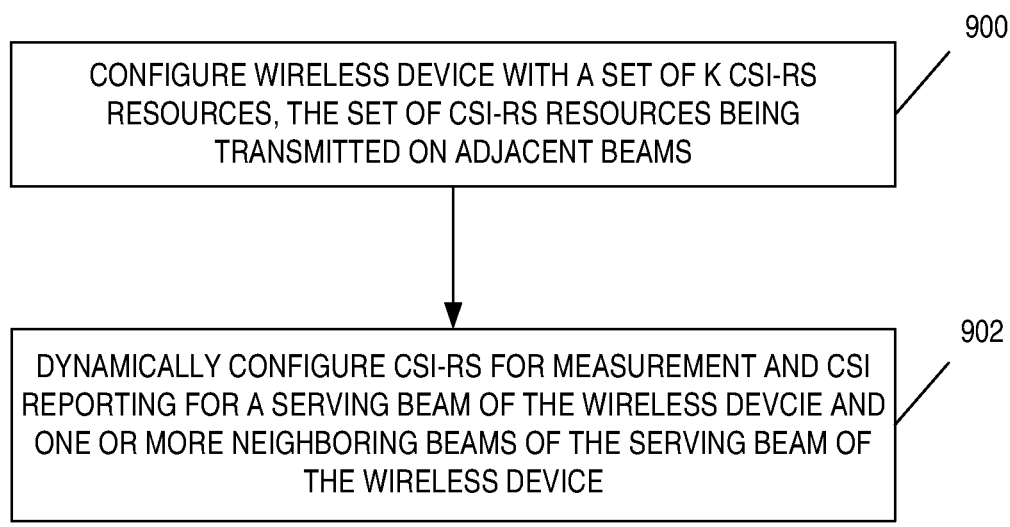
FIG. 14 illustrates the operation of the base station of FIG. 5 to dynamically configure CSI-RS resources for the wireless device from a set of K CSI-RS resources transmitted on adjacent beams from the perspective of the base station according to some embodiments of the present disclosure.

As discussed above, in some embodiments, the set of K CSI-RS resources configured for the wireless device 14 correspond to K different beam directions from the perspective of the base station 12. Further, in some embodiments, the K different beam directions include the beam direction of a serving beam of the wireless device 14 and beam directions of a number of neighboring beams of the serving beam of the wireless device 14. The base station 12 can then dynamically configure (and re-configure) the CSI-RS resource(s) for measurement at the wireless device 14 as the wireless device 14 transitions from one beam to another (i.e., as the serving beam of the wireless device 14 changes). In this regard, FIG. 14 illustrates the operation of the base station 12 according to some embodiments of the present disclosure. As illustrated, the base station 12 configures the wireless device 14 with a set of K CSI-RS resources (step 900). The configuration may be performed, as discussed above, via higher layer signaling (e.g., RRC signaling). Further, the set of K CSI-RS resources may be for multiple CSI processes (e.g., all CSI processes configured for the wireless device 14) or for a single CSI process (e.g., a separate set of CSI-RS resources may be configured for each CSI process). Here, the base station 12 transmits beamformed CSI-RSs, and the set of K CSI-RS resources are transmitted of K adjacent beams. The adjacent beams include a serving beam of the wireless device 14 and a number of neighboring beams of the serving beam of the wireless device 14.

The base station 12 dynamically configures CSI-RSs for measurement and CSI reporting for the serving beam of the wireless device 14 and one or more neighboring beams from the set of CSI-RS resources (step 902). The dynamic configuration may be performed via any suitable mechanism such as, for example, a DCI message or a LTE MAC CE. The base station 12 may configure one of the set of CSI-RS resources as a NZP CSI-RS for measurement on the serving beam and one or more other CSI-RS resources from the set as CSI-IM resources for interference measurement. The CSI-RS resources may continue to be dynamically configured such that different CSI-RS resources are configured for measurement and interference measurement as the wireless device 14 transitions from one beam to another.

Figure 15:
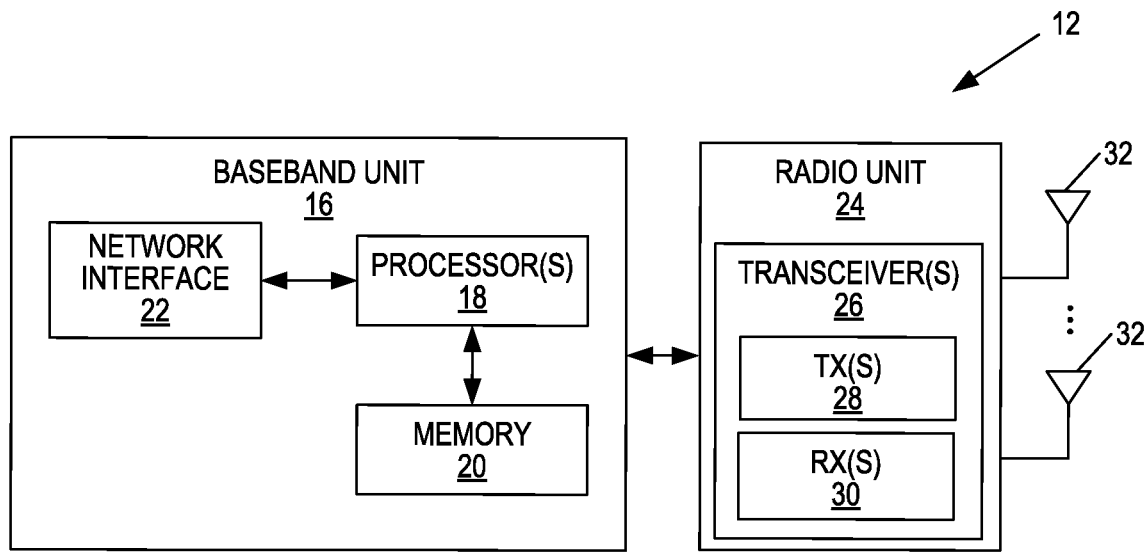
FIG. 15 is a block diagram of the base station according to some embodiments of the present disclosure.

FIG. 15 is a block diagram of the base station 12 (e.g., eNB) according to some embodiments of the present disclosure. As illustrated, the base station 12 includes a baseband unit 16 including at least one processor 18 (e.g., a Central Processing Unit (CPU), Application Specific Integrated Circuit (ASIC), Field-Programmable Gate Array (FPGA), etc.), memory 20, and a network interface 22 as well as a radio unit 24 including a wireless, or Radio Frequency (RF), transceiver 26 that includes one or more transmitters 28 and one or more receivers 30 coupled to one or more antennas 32. In some embodiments, the functionality of the base station 12 described herein is implemented in software that is stored in the memory 20 and executed by the at least one processor 18, whereby the base station 12 operates to, e.g., configure the set of CSI-RS resources for the wireless device 14, configure the measurement purposes of at least some and possibly all of the CSI-RS resources in the configured set, etc.

In some embodiments, a computer program is provided, where the computer program comprises instructions which, when executed on at least one processor (e.g., the at least one processor 18), cause the at least one processor to carry out the functionality of the base station 12 according to any of the embodiments described herein. In some embodiments, a carrier containing the computer program is provided, wherein the carrier is one of an electronic signal, an optical signal, a radio signal, or a computer readable storage medium (e.g., a non-transitory computer readable medium).

Figure 16:
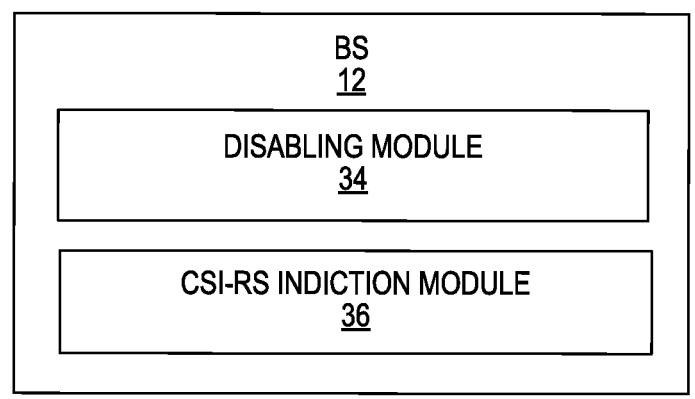
FIG. 16 is a block diagram of the base station according to other embodiments of the present disclosure.

FIG. 16 illustrates the base station 12 according to another embodiment of the present disclosure. As illustrated, the base station 12 includes a disabling module 34 (only in some embodiments) and a CSI-RS indication module 36 (only in some embodiments), each of which is implemented in software. The disabling module 34 operates to disable inter-subframe channel interpolation/filtering of the NZP CSI-RS and/or averaging of CSI-IM belonging to a CSI process for the wireless device 14 by, e.g., transmitting an appropriate message(s) or signal(s) via an associated transmitter of the base station 12, as discussed above. The CSI-RS indication module 36 operates to indicate to the wireless device 14 which CSI-RSs to measure by, e.g., transmitting an appropriate message(s) or signal(s) via an associated transmitter of the base station 12. As discussed above, the indication of the CSI-RS resources on which the wireless device 14 is to measure may be provided by first configuring the wireless device 14 with a static or semi-static set of CSI-RS resources (e.g., via RRC signaling) and then dynamically configuring which of the CSI-RS resources that the wireless device 14 is to measure on, e.g., via a DCI message or LTE MAC CEs.

Figure 17:
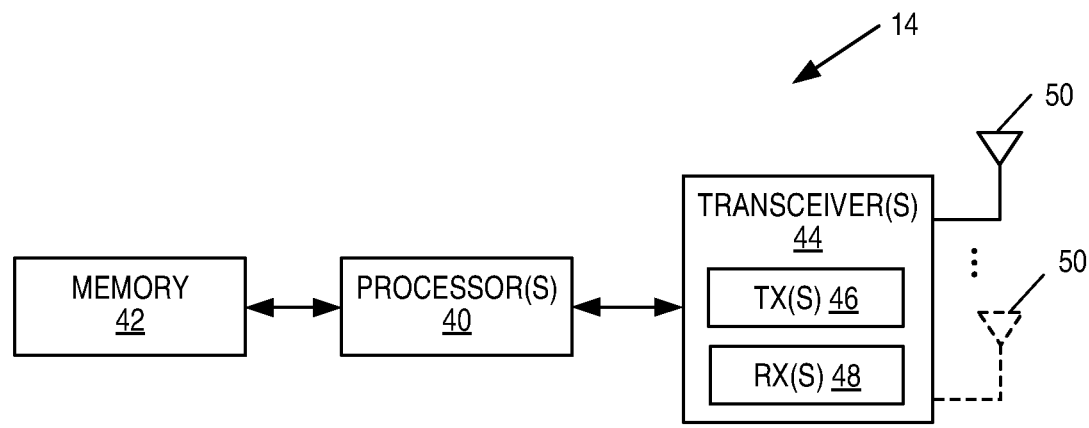
FIG. 17 is a block diagram of the wireless device according to some embodiments of the present disclosure.

FIG. 17 is a block diagram of the wireless device 14 according to some embodiments of the present disclosure. As illustrated, the wireless device 14 includes at least one processor 40, memory 42, and a wireless, or RF, transceiver 44 that includes one or more transmitters 46 and one or more receivers 48 coupled to one or more antennas 50. In some embodiments, the functionality of the wireless device 14 described herein is implemented in software that is stored in the memory 42 and executed by the at least one processor 40.

In some embodiments, a computer program is provided, where the computer program comprises instructions which, when executed on at least one processor (e.g., the at least one processor 40), cause the at least one processor to carry out the functionality of the wireless device 14 according to any of the embodiments described herein. In some embodiments, a carrier containing the computer program is provided, wherein the carrier is one of an electronic signal, an optical signal, a radio signal, or a computer readable storage medium (e.g., a non-transitory computer readable medium).

Figure 18:
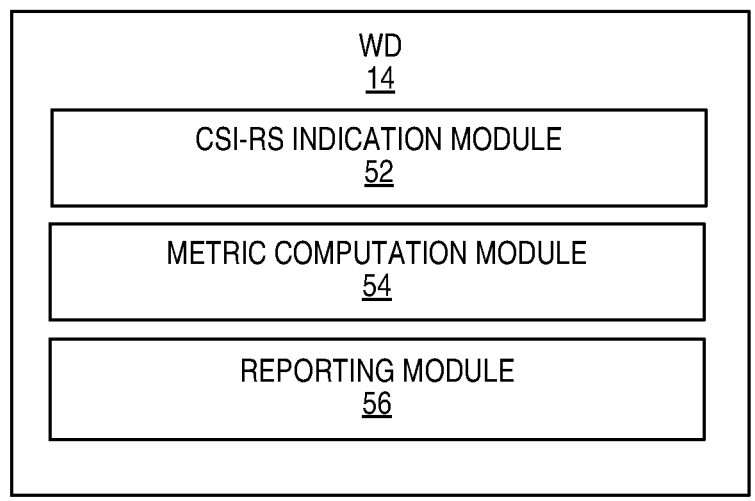
FIG. 18 is a block diagram of the wireless device according to other embodiments of the present disclosure.

FIG. 18 illustrates the wireless device 14 according to some other embodiments of the present disclosure. As illustrated, the wireless device 14 includes a CSI-RS indication module 52, a metric computation module 54, and a reporting module 56, each of which is implemented in software. The CSI-RS indication module 52 operates to receive an indication of which CSI-RSs to measure via a receiver(s) of the wireless device 14 (not shown). As discussed above, the CSI-RS indication module 52 may first receive a static or semi-static configuration of a set of CSI-RS resources (e.g., one set of CSI resources per CSI process or one set of CSI-RS resources for multiple CSI processes). Then, the CSI-RS indication module 52 receives, via a receiver(s) of the wireless device 14 (not shown), a dynamic configuration of which of the CSI-RS resources in the configured set(s) of CSI-RS resources that the wireless device 14 is to measure on for CSI reporting. The metric computation module 54 then computes a measurement(s) on the dynamically configured CSI-RS resource(s). The reporting module 56 then transmits a CSI report to the network (e.g., to the base station 12) based on the measurement(s) via an associated transmitter (not shown) of the wireless device 14.

Embodiments of systems and methods for flexible CSI feedback are disclosed. In some embodiments, a network node (e.g., a radio access node such as, but not limited to, a base station) indicates to a wireless device (e.g., a UE) which CSI-RS resource to measure. In some embodiments, this is accomplished with an uplink grant to the wireless device.

In one embodiment, the base station configures the wireless device with a set of K CSI-RS resources by higher layer signaling, e.g. by using an RRC message. The base station then indicates to the wireless device, possibly in an uplink scheduling grant message or some other form of message (e.g., downlink assignment, MAC CE, or a dedicated message on a downlink control channel), at least one CSI-RS resource of the K CSI-RS resources to be used by the wireless device. This at least one CSI-RS resource is the CSI-RS resource for which the UE should perform channel measurements. The wireless device then computes measurements on the at least one CSI-RS resource out of the set of K possible CSI-RS resources. In some embodiments, the K CSI-RS resources may correspond to K different beam directions as seen from the base station. In one embodiment, K=20 since 20 two-port CSI-RSs can be transmitted in a single subframe.

In some embodiments, the network node also indicates to the wireless device that the wireless device should disable the inter-subframe channel interpolation/filtering of the NZP CSI-RS belonging to a CSI process prior to indicating to the wireless device which CSI-RS resource to measure. In some embodiments, this is accomplished via higher layer signaling such as RRC signaling or via a DCI message. In some embodiments, the base station also indicates that the averaging of CSI-IM estimates is not allowed across subframes. In some embodiments, the signaling may further indicate for which CSI processes (e.g., predetermined to be all or a subset of the possible CSI processes) this applies. In some embodiments, the RRC information element for configuring a CSI process may be extended with a bit controlling whether inter-subframe NZP CSI-RS filtering is enabled or disabled.

In some embodiments, the wireless device then measures the indicated CSI-RS. The wireless device then reports the selected CSI-RS to the base station. In some embodiments, this is a periodically scheduled CSI feedback. In some embodiments, this is an aperiodic CSI feedback. In some embodiments, the aperiodic request is sent in an uplink grant.

In some embodiments, the wireless device is monitoring a set of NZP CSI-RS configurations and selects a subset of those NZP CSI-RS configurations for reporting CSI. In some embodiments, the selection could, for example, be based on estimates of channel strengths for the monitored NZP CSI-RS configurations (e.g., the subset could be selected to correspond to the N strongest channels).

In some embodiments, the base station also indicates which one of the CSI-RS resources should be used as a CSI-IM resource. In some embodiments, the wireless device shall assume PDSCH rate matching around all CSI-RS resources indicated in the higher layer configuration.

In some embodiments, periodic CSI reports using PUCCH are computed based on the CSI-RS resource indicated in a downlink DCI message. The wireless device will use the selected CSI-RS resource for CSI feedback until an indication of a new CSI-RS is received by the wireless device in a DCI message. Additionally, the wireless device may provide an indication confirming which CSI-RS resource is measured, the indication comprising an index of the measured CSI-RS resource or alternatively a bit confirming that the downlink DCI message was successfully received and that the CSI-RS resource in the DCI message is used in the measurement.

In some embodiments, periodic CSI reports using PUCCH are computed based on the CSI-RS resource indicated in an LTE MAC CE. In some embodiments, the wireless device may provide an indication confirming which CSI-RS resource is measured, the indication comprising an index of the measured CSI-RS resource or alternatively a bit confirming that the MAC CE was successfully received and that the CSI-RS resource is used in the measurement.

In some embodiments, the CSI resources configured to the wireless device are transmitted in adjacent beams. Hence, the base station can dynamically change the CSI measurement reports from the wireless device for the current beam serving the wireless device and for the neighboring beams of this serving beam.

Embodiments of systems and methods for CSI feedback are disclosed. In one embodiment, a method for CSI feedback, which is dynamic, has low UE complexity and solves the problems mentioned above:

- A message is signaled from an eNB to the UE so that the UE disables the inter-subframe channel interpolation/filtering of the NZP CSI-RS belonging to a CSI process.
- A dynamically signaled message (e.g., the uplink grant that schedules an (aperiodic) CSI report) contains an indicator for which CSI-RS resource the UE shall perform measurements on for a subsequent aperiodic CSI feedback transmitted on PUSCH.
  - Since the uplink grant is delivered by layer 1 and because the UE only transmits the aperiodic report when triggered to do so, there is no uncertainty on when the UE has received the indication.
- After the CSI-RS resource indicator carried by DCI has been received, the following periodic CSI reports transmitted using PUCCH will be based on measurements on the indicated CSI-RS.
- A confirmation indicator of the CSI-RS resource may be included in the periodic CSI-RS report to validate that the DCI was received, and that the measured CSI-RS resource is the one carried by the DCI.

Embodiments of the CSI feedback framework disclosed herein have large benefits over the LTE CSI framework when operating in an environment where CSI-RS need to be reconfigured often as in the case of many small cells or narrow beams and medium to high UE mobility.

The following acronyms are used throughout this disclosure.

μs Microsecond
2D Two-Dimensional
3GPP 3$^{rd}$ Generation Partnership Project
ACK Acknowledgement
ABS Almost Blank Subframe
AP Antenna Port
ARQ Automatic Repeat Request
ASIC Application Specific Integrated Circuit
CDM Code-Division Multiplexing
CE Control Element
CFI Control Format Indicator
CoMP Coordinated Multipoint
CPU Central Processing Unit
CQI Channel Quality Information
CRS Cell-Specific Reference Symbol
CSI Channel State Information
CSI-RS Channel State Information Reference Signal
DCI Downlink Control Information
DFT Discrete Fourier Transform
DL Downlink
eNB Enhanced or Evolved Node B
EPDCCH Enhanced Physical Downlink Control Channel
FPGA Field-Programmable Gate Array
GSM Global System for Mobile Communications
HARQ Hybrid Automatic Repeat Request
ID Identifier
IM Interference Measurement
LTE Long Term Evolution
MAC Medium Access Control
ms Millisecond
NZP Non-Zero-Power
PDCCH Physical Downlink Control Channel
PDSCH Physical Downlink Shared Channel
PMI Precoding Matrix Indicator
PRB Physical Resource Block
PUCCH Physical Uplink Control Channel
PUSCH Physical Uplink Shared Channel
OFDM Orthogonal Frequency Division Multiplexing
QPSK Quadrature Phase Shift Keying
RB Resource Block
RE Resource Element
RF Radio Frequency
RI Rank Indicator
RPSF Reduced Power Subframe
RRC Radio Resource Control
SF Subframe
TM9 Transmission Mode 9
TM10 Transmission Mode 10
TS Technical Specification
TP Transmission Point
UE User Equipment
UL Uplink
UMB Ultra Mobile Broadband
WCDMA Wideband Code Division Multiple Access
ZP Zero-Power

What is claimed is:

1. A method of operation of a base station of a cellular communications network to enable flexible Channel State Information (CSI) feedback, comprising:
configuring a wireless device, via a Radio Resource Control (RRC) message, with a set of non-zero power Channel State Information Reference Signal (CSI-RS) resources and a set of Channel State Information Interference Measurement (CSI-IM) resources;
dynamically configuring a non-zero power CSI-RS resource from the set of non-zero power CSI-RS resources for measurement and dynamically configuring a CSI-IM resource from the set of CSI-IM resources for interference measurement via a Downlink Control Information (DCI) message;
receiving an acknowledgement from the wireless device that indicates that the dynamic configuration of the non-zero power CSI-RS resource was received by the wireless device;
receiving a CSI report from the wireless device determined from the non-zero power CSI-RS resource dynamically configured for measurement and the CSI-IM resource dynamically configured for interference measurement; and
discarding any CSI reports received from the wireless device for a predefined amount of time after receiving the acknowledgement from the wireless device.

2. The method of claim 1, wherein the base station transmits beamformed CSI-RS, each beamformed CSI-RS corresponding to a different beam direction.

3. The method of claim 1, wherein:
the wireless device uses two or more CSI processes for CSI reporting, and configuring the wireless device with the set of non-zero power CSI-RS resources comprises configuring the wireless device with the set of non-zero power CSI-RS resources for a particular CSI process of the two or more CSI processes of the wireless device; and
dynamically configuring the non-zero power CSI-RS resource from the set of non-zero power CSI-RS resources for measurement comprises dynamically configuring the non-zero power CSI-RS resource from the set of non-zero power CSI-RS resources such that the non-zero power CSI-RS resource is configured for measurement for the particular CSI process.

4. The method of claim 3 further comprising:
configuring the wireless device with a respective set of non-zero power CSI-RS resources for each additional CSI process of the two or more CSI processes of the wireless device; and
for each additional CSI process of the wireless device, dynamically configuring a non-zero power CSI-RS resource from the respective set of non-zero power CSI-RS resources for measurement.

5. The method of claim 1, wherein the wireless device uses two or more CSI processes for CSI reporting, the set of non-zero power CSI-RS resources is a common set of non-zero power CSI-RS resources for the two or more CSI processes, and dynamically configuring the non-zero power CSI-RS resource from the set of non-zero power CSI-RS resources for measurement comprises dynamically configuring the non-zero power CSI-RS resource from the set of non-zero power CSI-RS resources such that the non-zero power CSI-RS resource is configured for measurement for the two or more CSI processes.

6. The method of claim 1, wherein configuring the wireless device with the set of non-zero power CSI-RS resources comprises configuring the wireless device with the set of non-zero power CSI-RS resources via higher layer signaling.

7. The method of claim 1, further comprising:
receiving one or more additional CSI reports from the wireless device determined from the non-zero power CSI-RS resource dynamically configured for measurement, wherein the one or more additional CSI reports are transmitted at predetermined time instants.

8. The method of claim 7, further comprising receiving an indication from the wireless device confirming that the non-zero power CSI-RS resource was used for the CSI report.

9. The method of claim 1, further comprising:
receiving a subsequent CSI report from the wireless device determined from a default non-zero power CSI-RS resource.

10. The method of claim 1, wherein dynamically configuring the non-zero power CSI-RS resource from the set of non-zero power CSI-RS resources for measurement comprises dynamically configuring the non-zero power CSI-RS resource from the set of non-zero power CSI-RS resources for measurement such that the dynamic configuration of the non-zero power CSI-RS resource holds until a subsequent dynamic configuration of a new non-zero power CSI-RS resource is provided to the wireless device.

11. The method of claim 1, wherein Physical Downlink Shared Channel (PDSCH) rate matching is provided over the set of non-zero power CSI-RS resources.

12. A base station of a cellular communications network, the base station comprising:
at least one transmitter;
at least one receiver;
at least one processor; and
memory storing software instructions executable by the at least one processor whereby the base station is operative to:
configure, via the at least one transmitter via a Radio Resource Control (RRC) message, a wireless device with a set of non-zero power Channel State Information Reference Signal (CSI-RS) resources, and a set of Channel State Information Interference Measurement (CSI-IM) resources;
dynamically configure, via the at least one transmitter, a non-zero power CSI-RS resource from the set of non-zero power CSI-RS resources for measurement and dynamically configure a CSI-IM resource from the set of CSI-IM resources for interference measurement via a Downlink Control Information (DCI) message;
receive, via the at least one receiver, an acknowledgement from the wireless device that indicates that the dynamic configuration of the non-zero power CSI-RS resource was received by the wireless device;
receive, via the at least one receiver, a CSI report from the wireless device determined from the non-zero power CSI-RS resource dynamically configured for measurement and the CSI-IM resource dynamically configured for interference measurement; and
discard any CSI reports received from the wireless device for a predefined amount of time after receiving the acknowledgement from the wireless device.

13. The base station of claim 12, wherein the base station is operative to transmit beamformed CSI-RS, each beamformed CSI-RS corresponding to a different beam direction.

14. The base station of claim 13, wherein each non-zero power CSI-RS resource in the set of non-zero power CSI-RS resources is beamformed and each non-zero power CSI-RS resource corresponds to a different beam direction.

15. The base station of claim 13, wherein the wireless device uses two or more CSI processes for CSI reporting, and the base station is further operative to:
   configure the wireless device with the set of non-zero power CSI-RS resources for a particular CSI process of the two or more CSI processes of the wireless device; and
   dynamically configure the non-zero power CSI-RS resource from the set of non-zero power CSI-RS resources such that the non-zero power CSI-RS resource is configured for measurement for the particular CSI process.

16. The base station of claim 12, wherein the wireless device uses two or more CSI processes for CSI reporting, the set of non-zero power CSI-RS resources is a common set of non-zero power CSI-RS resources for the two or more CSI processes, and the base station is further operative to dynamically configure the non-zero power CSI-RS resource from the set of non-zero power CSI-RS resources such that the non-zero power CSI-RS resource is configured for measurement for the two or more CSI processes.

17. The base station of claim 12, wherein the base station is further operative to receive a subsequent CSI report from the wireless device determined from a default non-zero power CSI-RS resource.

18. The base station of claim 12, wherein the base station is further operative to dynamically configure the non-zero power CSI-RS resource from the set of non-zero power CSI-RS resources for measurement such that the dynamic configuration of the non-zero power CSI-RS resource holds until a subsequent dynamic configuration of a new non-zero power CSI-RS resource is provided to the wireless device.

19. The base station of claim 12, wherein the base station is further operative to configure a different non-zero power CSI-RS resource from the set of non-zero power CSI-RS resources for interference measurement.

* * * * *